United States Patent [19]

Belser et al.

[11] Patent Number: 5,400,313

[45] Date of Patent: Mar. 21, 1995

[54] OPTICAL DATA STORAGE SYSTEM AND METHOD WITH REDUCED HEAT BUILDUP

[75] Inventors: Karl A. Belser; Jerry E. Hurst, Jr., both of San Jose; Michael R. Madison, Los Gatos, all of Calif.

[73] Assignee: International Business Machines Corporation, Armonk, N.Y.

[21] Appl. No.: 973,484

[22] Filed: Nov. 9, 1992

[51] Int. Cl.6 .................... G11B 7/00; G01D 9/00
[52] U.S. Cl. ........................ 369/116; 369/59; 369/275.1; 360/40; 347/247; 347/262
[58] Field of Search ............ 360/40, 59, 77.02, 77.04, 360/77.05, 77.08; 369/116, 51, 54, 59, 275.1; 346/108, 76 L

[56] References Cited

U.S. PATENT DOCUMENTS

| | | | |
|---|---|---|---|
| 4,383,262 | 5/1983 | Noguchi | 346/108 |
| 4,473,829 | 9/1984 | Immink et al. | 346/108 |
| 4,488,277 | 12/1984 | McFarlane et al. | 369/48 |
| 4,646,103 | 2/1987 | Sugiyama et al. | 346/108 |
| 4,731,773 | 3/1988 | Lewkowicz | 369/59 |
| 4,734,900 | 3/1988 | Davie | 369/59 |
| 4,774,522 | 9/1988 | Van Tongeren et al. | 346/1.1 |
| 4,866,692 | 9/1989 | Saito et al. | 369/59 |
| 4,872,078 | 10/1989 | Gerber et al. | 360/114 |
| 4,873,680 | 10/1989 | Chung et al. | 369/59 |
| 4,881,076 | 11/1989 | Ashley et al. | 369/54 |
| 4,928,187 | 5/1990 | Rees | 360/40 |
| 4,949,196 | 8/1990 | Davie | 360/40 |
| 4,998,237 | 3/1991 | Osakabe et al. | 369/109 |
| 5,001,692 | 3/1991 | Farla | 369/116 |
| 5,003,527 | 3/1991 | Matsumoto et al. | 369/100 |
| 5,043,971 | 8/1991 | Van et al. | 369/124 |
| 5,060,222 | 10/1991 | Sawano et al. | 369/121 |
| 5,231,545 | 7/1993 | Gold | 360/40 |

FOREIGN PATENT DOCUMENTS

| | | | |
|---|---|---|---|
| 0206824 | 12/1986 | European Pat. Off. | G11B 7/013 |
| 55-139693 | 10/1980 | Japan | G11C 13/00 |
| 60-247827 | 7/1985 | Japan | G11B 7/00 |
| 63-263632 | 10/1988 | Japan | G11B 7/00 |
| 1-155522 | 6/1989 | Japan | G11B 7/00 |
| 01-229426 | 9/1989 | Japan | G11B 7/00 |
| 2-208834 | 8/1990 | Japan | G11B 7/125 |
| 3-35425 | 2/1991 | Japan | G11B 7/00 |

Primary Examiner—Georgia Y. Epps
Assistant Examiner—Kim-Kwok Chu
Attorney, Agent, or Firm—Douglas R. Millett

[57] ABSTRACT

An optical data storage system records pulse width modulated data as a series of contiguous and overlapping circular marks. A minimum number of circular marks are used to record the desired run length. Circular marks which overlap by greater or equal to one half the diameter of the circular mark are recorded using two different laser power levels. The result is that thermal buildup in the medium is kept to a minimum and the edge transitions are accurately positioned.

64 Claims, 16 Drawing Sheets

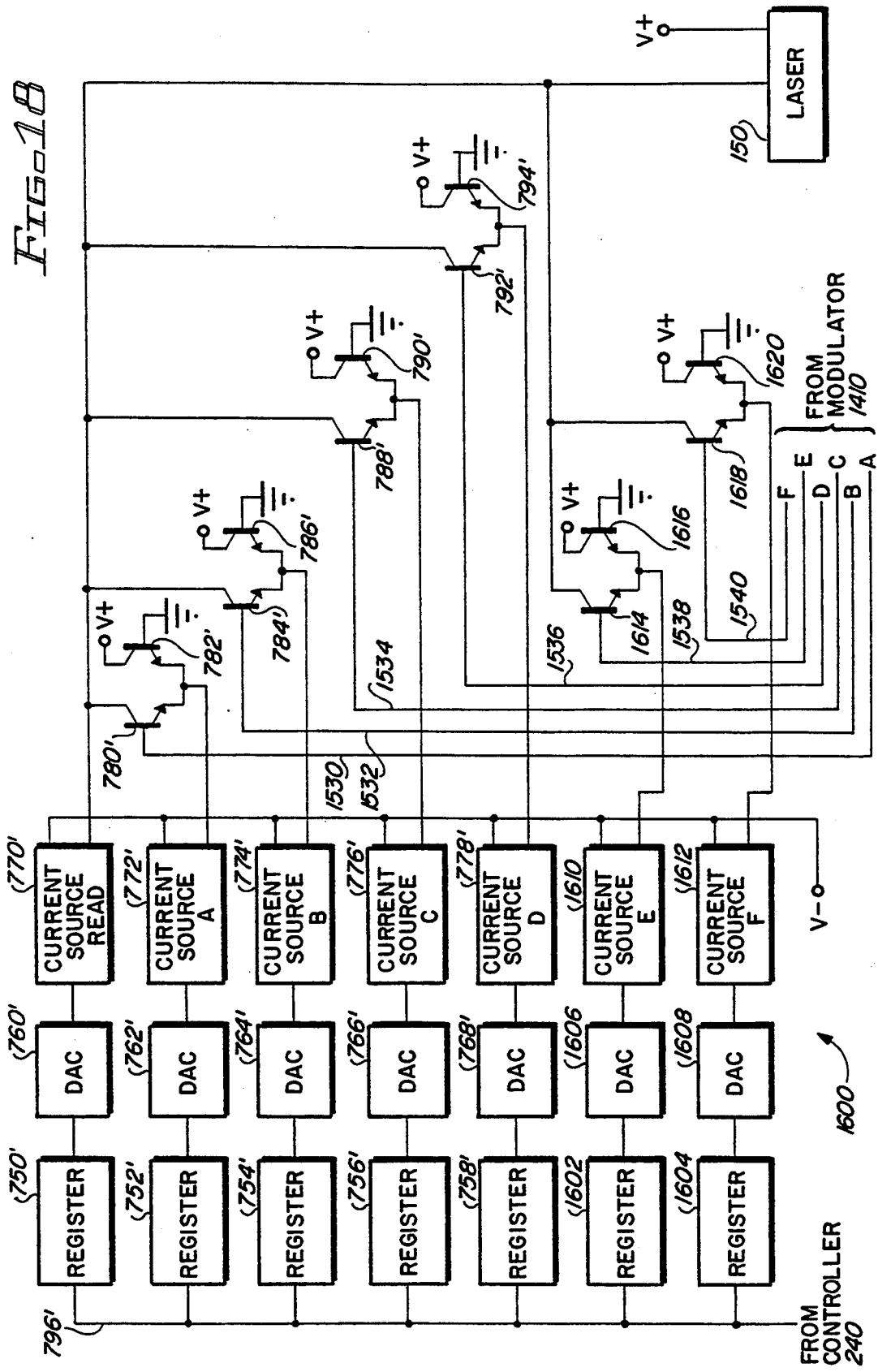

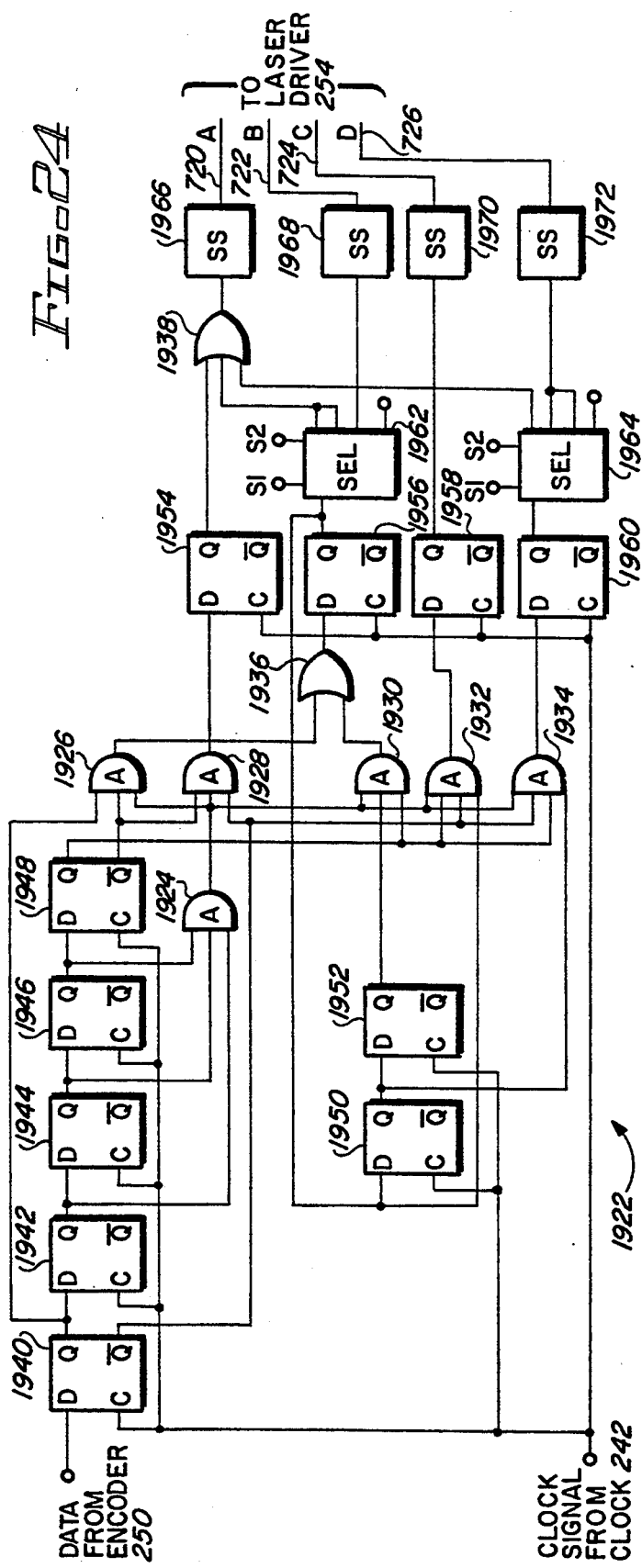
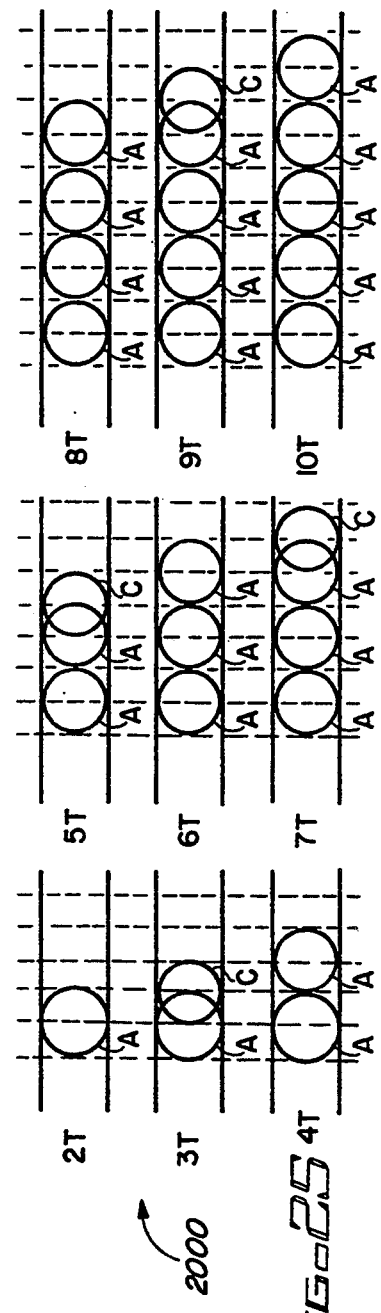
FIG-24
FIG-25

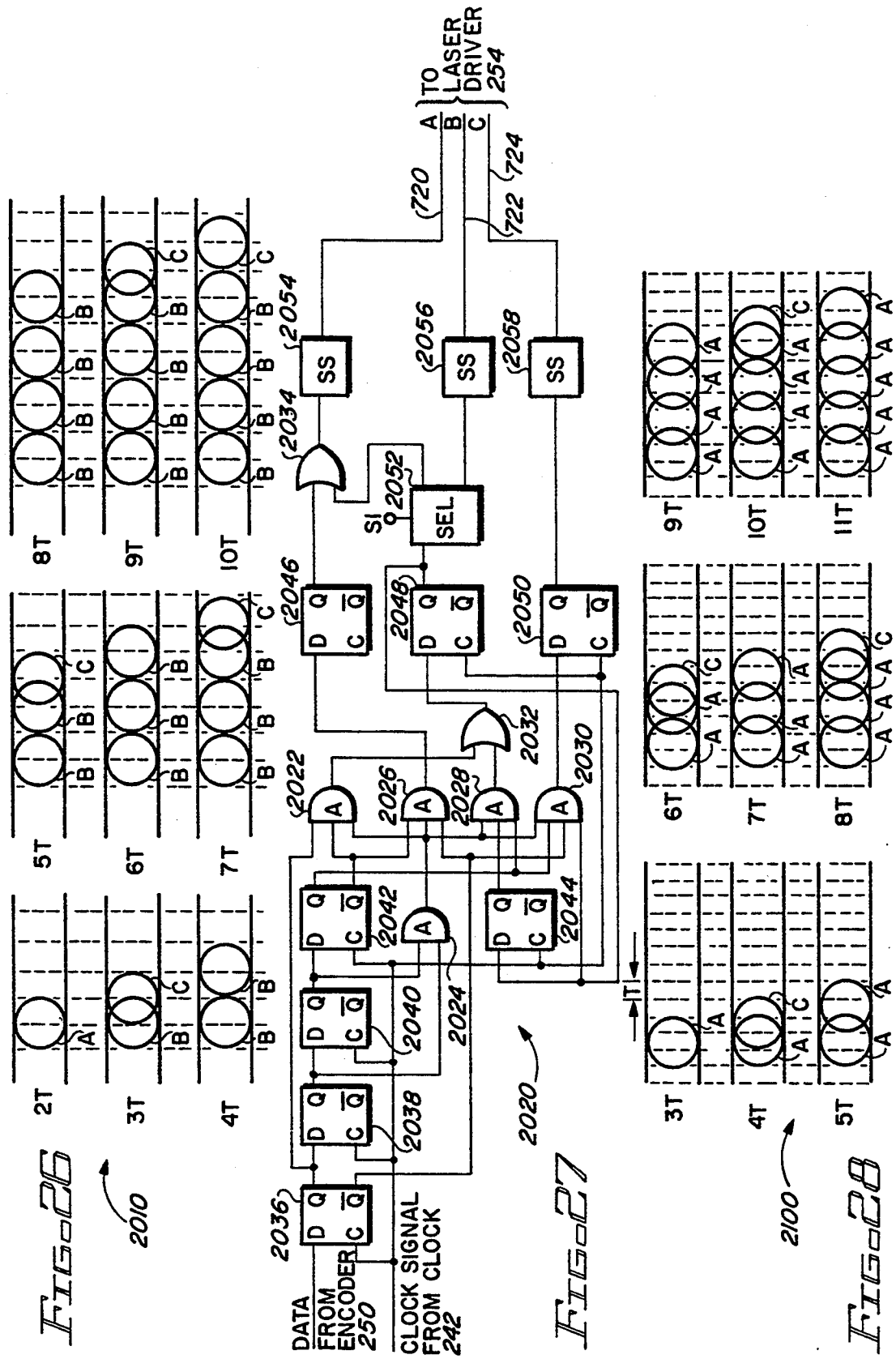

OPTICAL DATA STORAGE SYSTEM AND METHOD WITH REDUCED HEAT BUILDUP

BACKGROUND OF THE INVENTION

1. Field of the Invention

This invention relates generally to optical data storage systems and more particularly to pulse width modulation recording in such systems.

2. Description of the Prior Art

Pulse position modulation (PPM) and pulse width modulation (PWM) are two general ways to record information on data storage media. PPM records information as the distance between the centers of the marks on the medium. PWM records information as the distance between the transitions of the marks. A transition is either the beginning (leading) or end (trailing) edge of a mark.

PWM recording is preferred to PPM recording because PWM recording is able to store more information in the same amount of space on the medium. In other words, the data storage density can be greatly increased by using PWM recording. However, PWM recording is more difficult to implement because the transition edges must be precisely positioned and written with sharp boundaries to ensure accurate recording. Unwanted variation in laser power, magnetic field strength, operating temperature, the number of times the media has been written and erased (cycling), etc., can cause the exact position of these transitions to change. In addition to these problems, thermal buildup within the medium during the writing process can cause great distortions in the placement of the mark edge. U.S. Pat. No. 4,928,187 issued May 22, 1990 discusses this problem.

One solution to this problem is to use direct overwrite. In a direct overwrite system, the laser beam is left on continuously and the magnetic field is modulated in order to record data. U.S. Pat. No. 4,872,078 issued Oct. 3, 1989, shows one such system.

Another solution to the thermal problem is to adjust the laser pulse duration in order to achieve the correct mark length. Some of these systems use a series of highly pulsed laser beams to write contiguous or overlapping circular marks on the medium in order to form one long mark. Examples of these systems include U.S. Pat. No. 4,473,829 issued Sep. 25, 1984; U.S. Pat. No. 4,488,277 issued Dec. 11, 1984; U.S. Pat. No. 4,734,900 issued Mar. 29, 1988; U.S. Pat. No. 4,873,680 issued Oct. 10, 1989; U.S. Pat. No. 4,998,237 issued Mar. 5, 1991; Japanese patent application 03-35425 published Feb. 15, 1991; Japanese patent application 02-208834 published Aug. 20, 1990; Japanese patent application 01-155522 published Jun. 19, 1989; and Japanese patent application 63-263632 published Oct. 31, 1980. However, these systems still experience some thermal buildup with the resulting inaccuracy in the placement of the transition edge and blurring of the boundary.

What is really needed is a relatively simple system and method to record mark transitions precisely without experiencing thermal buildup.

SUMMARY OF THE INVENTION

Briefly, in a preferred embodiment of the present invention, an optical data storage system uses pulse width modulation to record data on an optical medium. A laser directs a laser beam to the medium. The laser is controlled by a modulator which causes the laser to emit the laser beam in a highly pulsed manner at different power levels. The pulsed laser writes circular marks of substantially the same size on the medium. The PWM runs are recorded on the medium as a single isolated mark or as a series of contiguous or overlapping circular marks.

The first mark in a run is referred to as a leading edge mark and the last mark in a run is referred to as a trailing edge mark. If a run consists of only the leading and trailing marks, and the two marks overlap by one half of the mark diameter or more, one of the marks is written with a laser beam at a reduced power level. If a run consists of three or more marks, then the space between the leading and trailing edge marks is filled with one or more filler marks. If one of the filler marks overlaps one of the other marks by one half of the mark diameter or more, one of the two overlapping marks is written with a laser beam at a reduced power level. Alternatively, the overlapping filler mark in a run of three or more marks, may be replaced with a smaller diameter filler mark which is contiguous with but does not overlap the surrounding marks. This smaller diameter filler mark is written at a greatly reduced laser power level and has its center point shifted slightly away from the preceding mark. The present invention writes the required run lengths using reduced laser power levels from that of the prior an and this results in a great reduction in the thermal buildup in the medium.

For a fuller understanding of the nature and advantages of the present invention, reference should be made to the following detailed description taken into conjunction with the accompanying drawings.

BRIEF DESCRIPTION OF THE DRAWINGS

FIG. 18 is a circuit diagram of a laser driver;

FIG. 24 is a circuit diagram of a modulator;

FIG. 25 is a schematic diagram of a recording pattern;

FIG. 26 is a schematic diagram of a recording pattern;

FIG. 27 is a circuit diagram of a modulator;

FIG. 28 is a schematic diagram of a recording pattern;

DESCRIPTION OF THE PREFERRED EMBODIMENTS

Pulse width modulation recording uses the distance between transitions of recorded runs to encode digital data. The length between transitions contains the information of the digital data. There are many different encodings schemes known in the art which may be used to encode digital data into pulse width modulation marks. The most popular type of encoding schemes use a run length limited (RLL) codes. These RLL codes use a small set of run lengths, which when used in different combinations encode any pattern of digital data. A run length is defined as the distance between the leading edge of a mark or series of connecting marks and the trailing edge. RLL codes are defined in units of time T. In disk drive systems this time period T corresponds to an amount of linear distance the disk rotates in the time period T. The RLL codes are designated in the form $(d-1, k-1)$, where d is the minimum run length (in time periods T) and k is the maximum run length (in time periods T). For example, a (2,7) code has a minimum run length of 3T. There are three time periods between the leading edge and trailing edge of this run length. The maximum run length for a (2,7) code is 8T. The distance between the transitions of the run lengths is determined by the formula $L=(V * m * T)+W$, where L is the distance between the transitions, V is the media velocity (meters per second), m is a positive integer, T is the channel code bit clock period, and W is the diameter of the standard size circular written mark made by the laser on the media.

Figure 1:
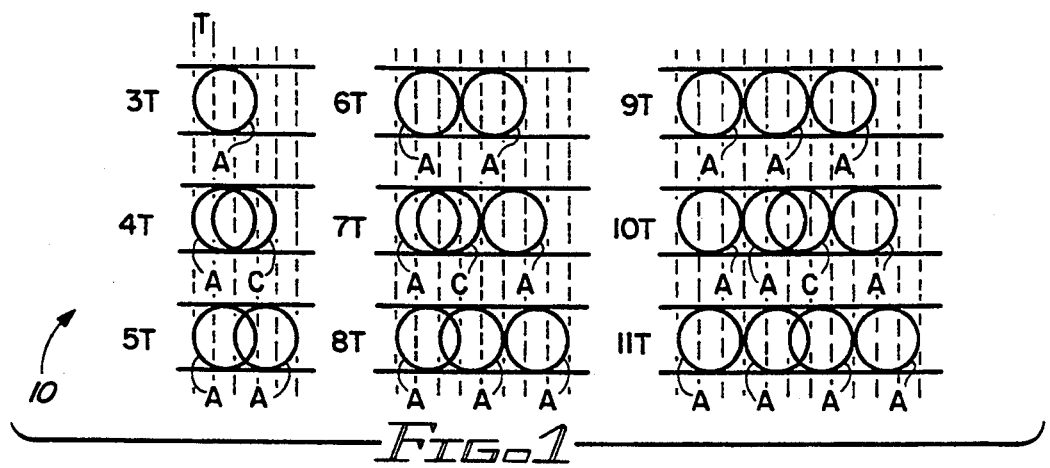
FIG. 1 is a schematic diagram of a recording pattern.

FIG. 1 is a schematic diagram of the recording pattern of the present invention which implements a (2,N) RLL code and is designated by the general reference number 10. The code consists of a set of run lengths of 3T to (N+1)T. All of these run length marks are formed by either an isolated mark or connecting marks which are contiguous or overlapping circular marks. As used herein, contiguous refers to marks which touch but do not overlap. The marks are made by a highly pulsed laser beam at one of two power levels, A or C, where A>C. These circular marks are made by focussing the laser beam to its smallest spot size. These patterns are written along concentric or spiral tracks on an optical data storage medium. The bracketing lines represent the orientation of the data tracks.

The minimum run length of 3T is comprised of a single isolated or nonconnecting circular mark formed by a highly pulsed laser beam at power level A. The 4T run is comprised of a first circular mark formed at power level A and a second circular mark formed at power level C which overlaps the first mark by two thirds of a circular mark diameter. The 5T run is comprised of a first circular mark at power level A and a second circular mark at power level A which overlaps the first mark by one third of a mark diameter. The 6T run is comprised of two contiguous marks formed at power level A. The 7T run is comprised of a first mark at power level A, a second mark formed at power level C which overlaps the first mark by two thirds of a mark diameter, and a third mark formed at power level A which is contiguous with the second mark. The 8T run is comprised of a first mark at power level A, a second mark at power level A which overlaps the first mark by one third of a mark diameter, and a third mark at power level A which is contiguous with the second mark. The 9T run is comprised of three contiguous marks formed at power level A. The 10T run is comprised of a first mark at power level A, a second contiguous mark formed at power level A, a third mark formed at power level C which overlaps the second mark by two thirds of a beam diameter, and a fourth mark formed at power level A which is contiguous with the third mark. The 11T run is formed of a first mark at power level A, a second mark at formed at power level A contiguous with the first mark, a third mark formed at power level A which overlaps the second mark by one third of a mark diameter, and a fourth mark formed at power level A which is contiguous with the third mark. It can be seen that the entire set of run lengths is based on combining the 3T, 4T and 5T run lengths. The 6T, 9T, etc., run lengths are made by adding together contiguous 3T marks. The 7T, 10T, etc., runs are made by combining the 4T run with a number of 3T marks. The 8T, 11T, etc., runs are made by combining the 5T mark with a number of 3T marks.

In the preferred embodiment, a (2,7) RLL code is used. In this case only the 3T-8T run lengths are needed. However, it can be seen that the present invention can be used with any number of (2,N) RLL codes.

This recording pattern reduces the thermal buildup in the medium to a minimum and it insures that the leading and trailing edges of the run will be accurately positioned. The pattern uses the absolute minimum number of circular marks to write the desired run lengths. Where the marks must overlap by one half a diameter or more, the second mark is written at a reduced power level. Where there are three or more marks, and an overlap must occur, the overlap does not occur on the trailing edge circular mark. This helps insure that the trailing edge, which is most susceptible to the thermal heat buildup, will be accurately positioned.

Figure 2:
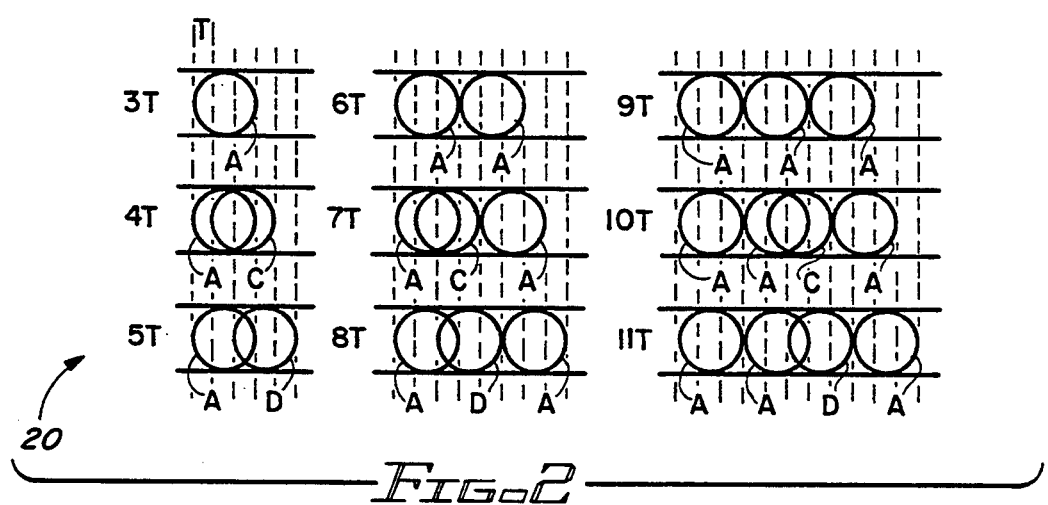
FIG. 2 is a schematic diagram of a recording pattern.

FIG. 2 is a schematic diagram of an alternative recording pattern of the present invention which implements a (2,N) RLL code and is designated by the general reference number 20. Note that the placement of the marks of pattern 20 is similar to that for pattern 10. The only difference is that pattern 20 uses three different power levels A, C and D, to record the marks rather than the two power levels of pattern 10. Power level A is greater than power level D which is greater than power level C. Where marks overlap by more than one half of a diameter, power level C is used on the second mark. Where the marks overlap by less than one half of a diameter, power level D is used on the second mark.

Figure 3:
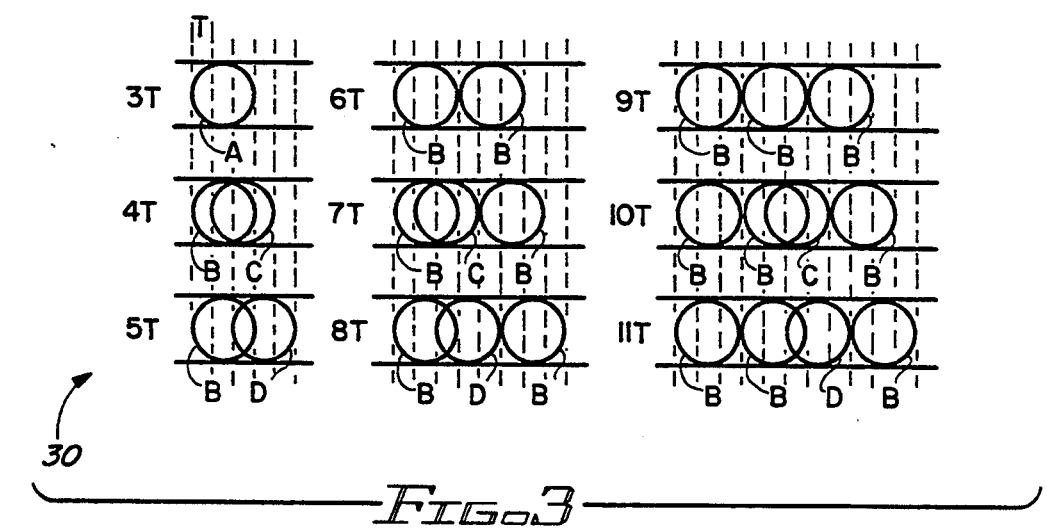
FIG. 3 is a schematic diagram of a recording pattern.

FIG. 3 is a schematic diagram of the recording pattern of the present invention which implements a (2,N) RLL code and is designated by the general reference number 30. Pattern 30 is similar to pattern 10 except that now four power levels are used A, B, C and D, where the power level A is greater than the power level B, which is greater than the power level D, which is greater than the power level C. In this pattern 30 the maximum power level A is reserved for the single isolated 3T mark.

Pattern 10 is the preferred method of implementing the present invention. The two power levels provide adequate control of the thermal buildup in the medium during recording. However, in certain situations it may be desirable to have even greater control over the thermal buildup in the media. In such cases, patterns 20 or 30 may be used.

Figure 4:
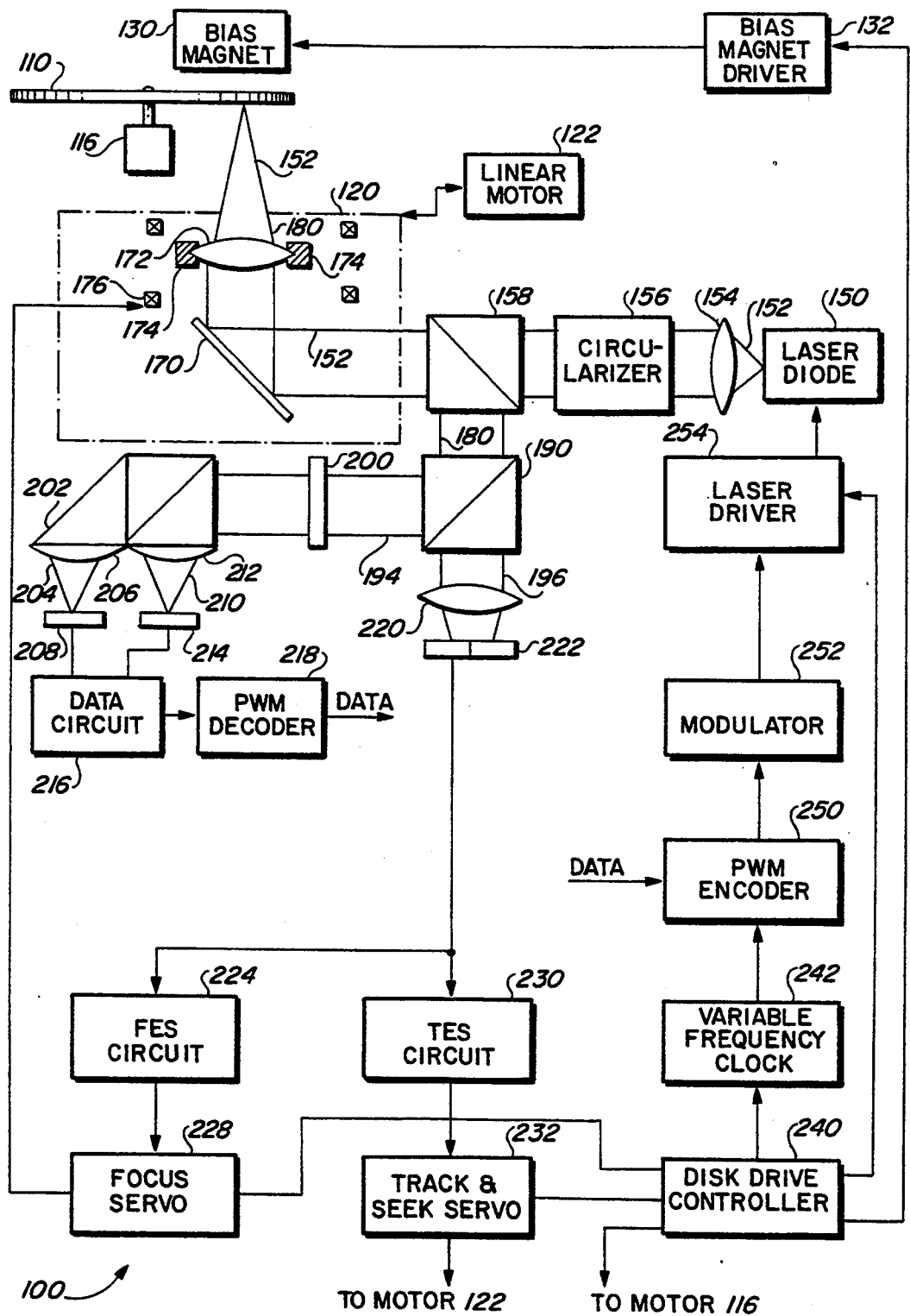
FIG. 4 is a schematic diagram of an optical data storage system.

FIG. 4 is a schematic diagram of an optical data storage system of the present invention and is designated by the general reference number 100. System 100 has a disk medium 110 which may be a standard magneto-optical data storage disk. Medium 110 is mounted to a spindle motor 116. An optical head 120 is positioned below medium 110. Head 120 is moved in a radial direction relative to disk 110 by a linear motor 122. A bias magnetic 130 is located above medium 110 and is connected to a bias magnet driver 132.

A laser 150 produces a polarized light beam 152. Any type of laser may be used, however, laser 150 is preferably a gallium-aluminum-arsenide laser diode which generates a light beam 152 at approximately 780 nm in wavelength. Light beam 152 is collimated by a lens 154 and circularized by a circularizer 156. Circularizer 156 is preferably a prism.

Beam 152 passes through a beamsplitter 158 to a mirror 170. Mirror 170 reflects the light toward a focussing lens 172. Lens 172 focuses beam 152 onto the disk 110. Lens 172 is mounted in a lens holder 174. Holder 174 may be moved relative to disk 110 by an actuator motor 176. Mirror 170, lens 172, holder 174 and motor 176 are preferably located in the optical head 120.

A light beam 180 is reflected from the disk 110, passes through lens 172 and is reflected by mirror 170. A portion of light beam 180 is then reflected by beamsplitter 158 to a beamsplitter 190. Beamsplitter 190 divides the beam 180 into a data beam 194 and a servo beam 196.

Data beam 194 passes through a half waveplate 200 to a polarizing beamsplitter 202. Beamsplitter 202 divides beam 194 into orthogonal polarization components. A first polarization component beam 204 is focussed by a lens 206 to a data detector 208. A second polarization component 210 is focussed by a lens 212 to a data optical detector 214. A data circuit 216 is connected to detectors 208 and 214, and generates a pulse width modulation data signal representative of the pattern of transitions recorded on medium 110. Data circuit 216 is connected to a pulse width modulation decoder 218 which converts the pulse width modulation signal to a digital data signal.

Servo beam 196 is focussed by a lens 220 onto a segmented optical detector 222, such as a spot size measuring detector as is known in the art. A focus error circuit 224 is connected to detector 222. A focus servo 228, as is known in the art, is connected to focus error signal (FES) circuit 224 and motor 176. Servo 228 controls motor 176 to adjust the position of lens 172 as appropriate in order to maintain proper focus. A tracking error signal circuit 230 is connected to detector 222. A track and seek servo 232, as is known in the art, is connected to tracking error signal (TES) circuit 230 and motor 122. Servo 232 causes motor 122 to adjust the position of head 120 as appropriate.

A disk drive controller 240, as is known in the art, is connected to and provides overall control for servo 228 and 232, spindle motor 116, magnet driver 132, and a variable frequency clock 242. Controller 240 adjusts the clocking speed of the clock 242 as appropriate depending upon the position of head 120. The spindle motor 116 is controlled to spin at a constant angular velocity and the linear velocity of beam 152 relative to disk 110 will vary depending upon the radial position of head 120. Variable frequency clock 242 (sometimes referred to as a frequency synthesizer) is well known in the art.

Clock 242 is connected to a pulse width modulation encoder 250. Encoder 250 receives a digital data signal and encodes it into the desired pulse width modulation code. In the preferred embodiment, encoder 250 is a (2,7) RLL pulse width modulation encoder. Pulse width modulation encoders are well known in the art and implement a variety of pulse width modulation codes. An example of a (1,7) encoder is shown in U.S. Pat. No. 4,488,142 and an example of a (2,7) encoder is shown in U.S. Pat. No. 3,689,899.

Encoder 250 is connected to a modulator 252. Modulator 252 receives the pulse width modulation code and causes the laser 150, via a laser driver 254 to write the desired patterns.

Figure 5:
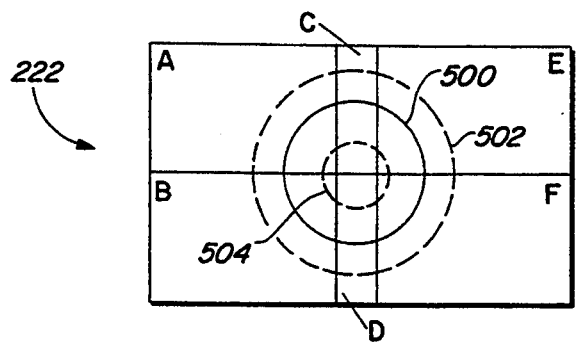
FIG. 5 is a schematic diagram of a portion of a system of FIG. 4.

FIG. 5 shows a top view of detector 222. Detector 222 is divided into six sections, 222 A, B, C, D, E and F.

Figure 6:
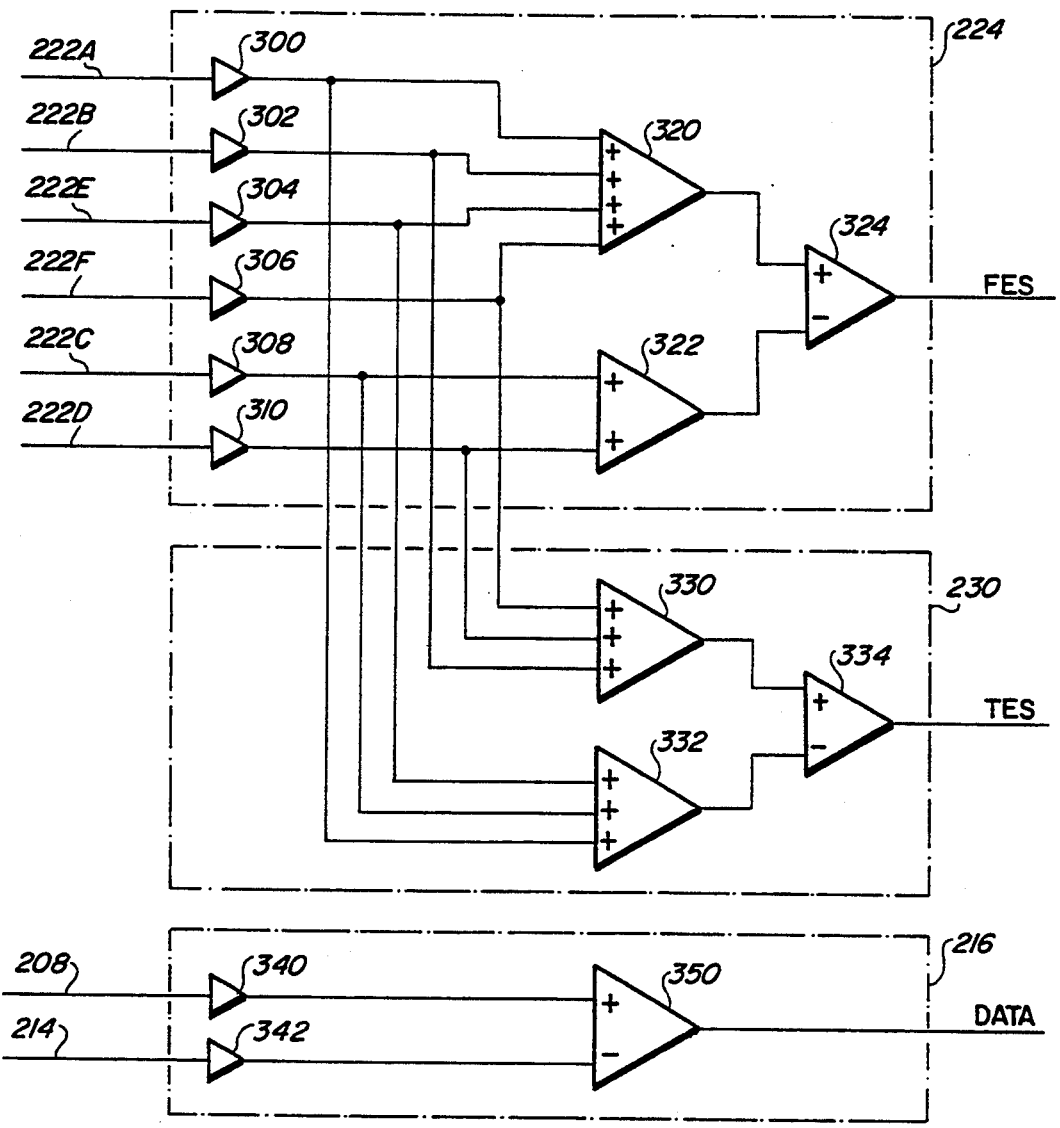
FIG. 6 is a circuit diagram of a portion of a system of FIG. 4.

FIG. 6 shows a circuit diagram of the TES circuit 230, the FES circuit 224, and the data circuit 216. FES circuit 224 comprises a plurality of amplifiers 300, 302, 304, 306, 308 and 310 connected to detector sections 222 A, B, E, F, C and D, respectively. A summing amplifier 320 is connected to amplifiers 300–306 and a summing amplifier 322 is connected to amplifiers 308 and 310. A differential amplifier 324 is connected to summing amplifiers 320 and 322 and generates the FES.

TES circuit 230 comprises a pair of summing amplifiers 330 and 332, and a differential amplifier 334. Amplifier 330 is connected to amplifiers 302, 306 and 310, and amplifier 332 is connected to amplifiers 300, 304 and 308. Differential amplifier 334 is connected to amplifiers 330 and 332 and generates a TES.

Data circuit 216 has a plurality of amplifiers 340 and 342 connected to detectors 208 and 214, respectively. A differential amplifier 350 is connected to amplifiers 340 and 342, and generates a data pulse width modulation data signal representative of the marks on the medium 110.

Figure 7:
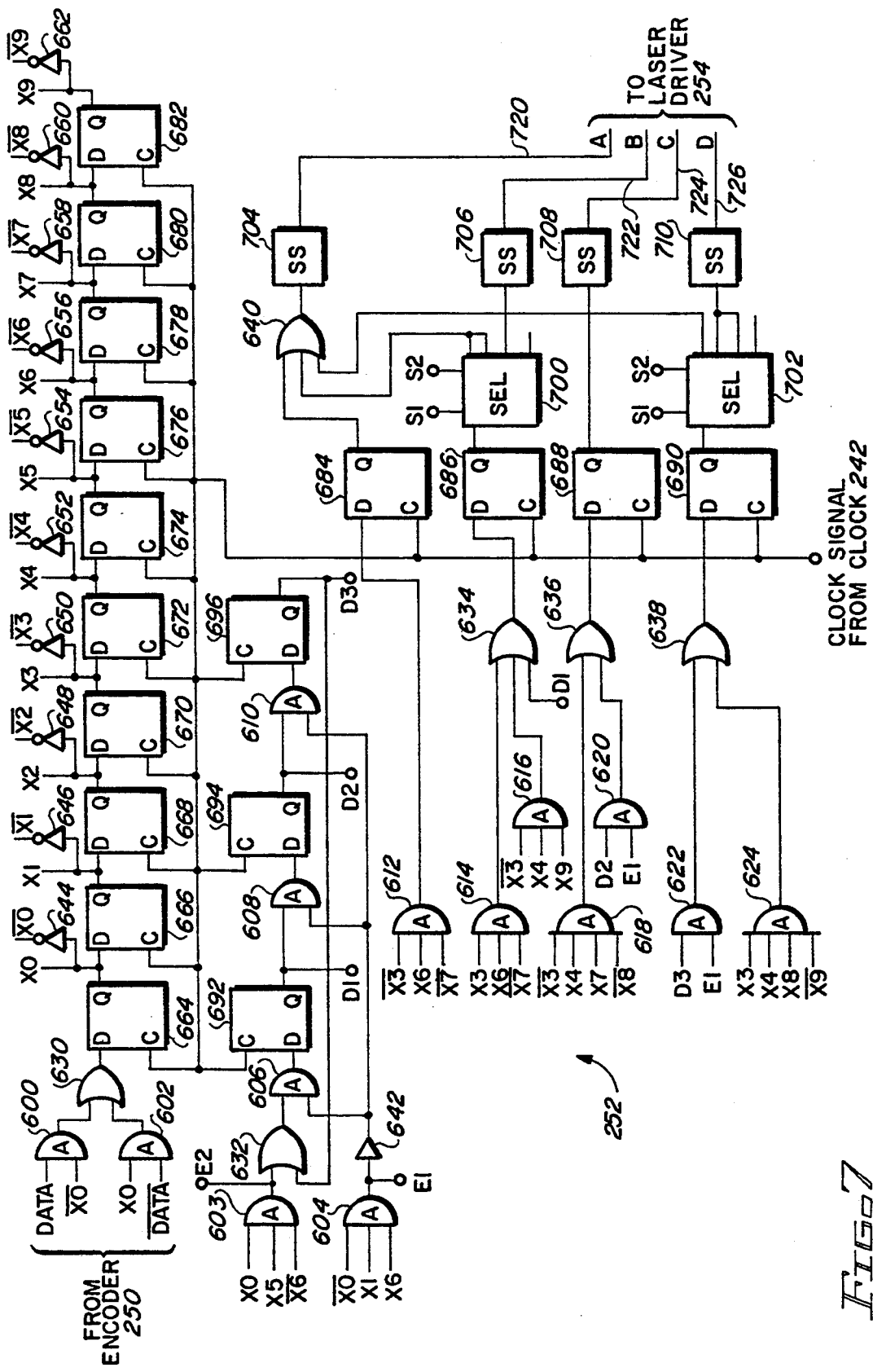
FIG. 7 is a circuit diagram of a portion of the system of FIG. 4.

FIG. 7 is a circuit diagram of a preferred embodiment of modulator 252. Modulator 252 is comprised of a plurality of AND gates 600–624, a plurality of OR gates 630–640, a plurality of inverters 642–662, a plurality of flip-flops 664–696, a plurality of selectors 700 and 702, and a plurality of single-shots 704–710.

Modulator 252 takes the data signal from encoder 250 and converts it into instructions to the laser driver for writing the pattern of the present invention. Modulator 252 may implement one of patterns 10, 20 or 30. Selectors 692 and 694 have two inputs (S1, S2). If (S1, S2) equals (0,0) pattern 10 will be implemented, if (0,1) pattern 20 will be implemented, and if (1,0) pattern 30 will be implemented. The selectors 692 and 694 may be set at the time of manufacture or they may be set by controller 240.

Lines 720, 722, 724 and 726, lead to the laser driver 254. Lines 720, 722, 724 and 726, represent the power levels A, B, C and D, respectively. Only one of these lines will be raised at a time and this informs the laser driver 254 which power level to use. The single shots 696–702 control the duration of the laser pulse. This pulse duration should be as small as possible and is approximately 15 nanoseconds or less in the preferred embodiment.

Figure 8:
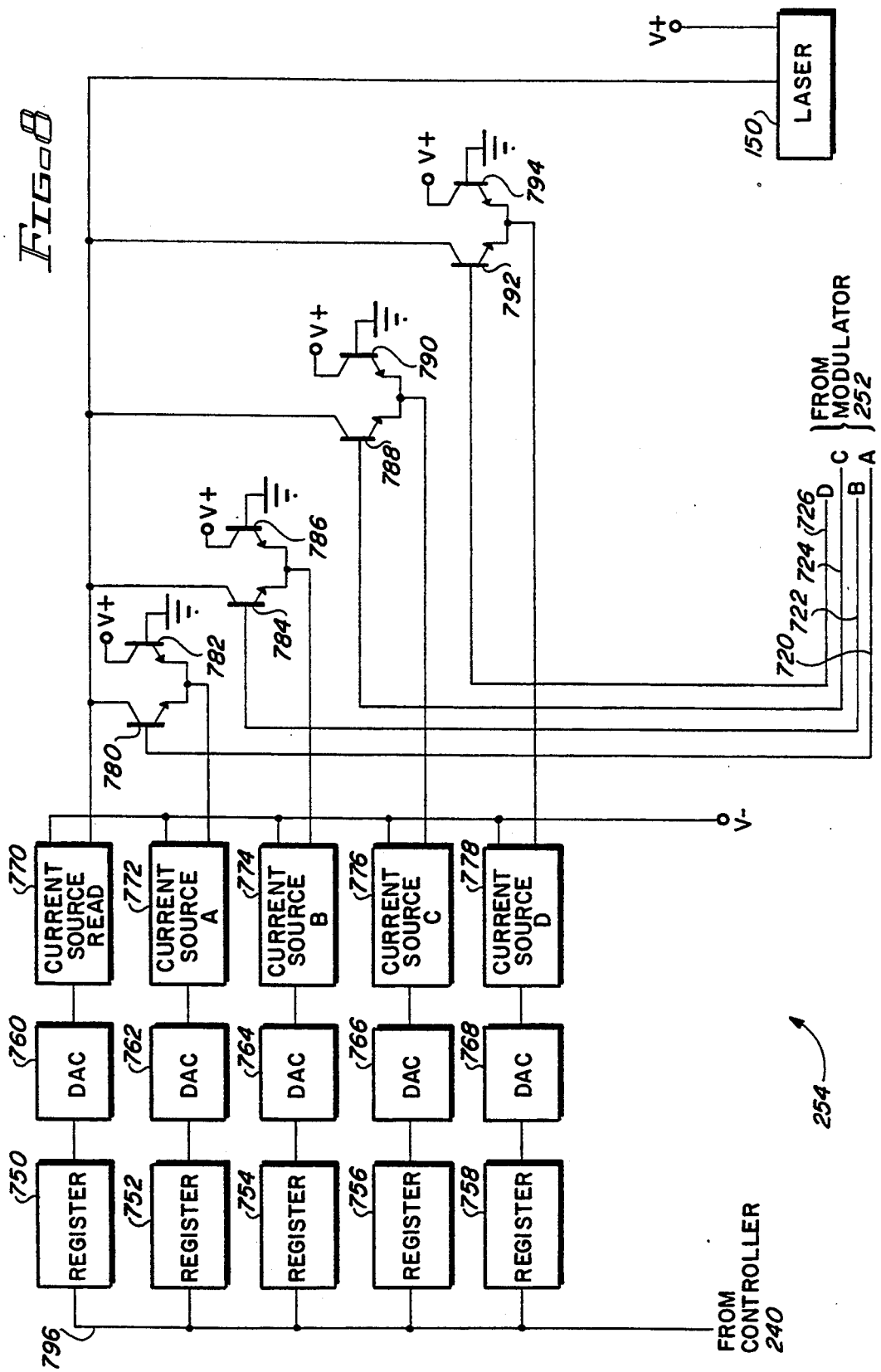
FIG. 8 is a circuit diagram of a portion of the system of FIG. 4.

FIG. 8 is a circuit diagram of laser driver 254. Driver 254 is comprised of a plurality of registers 750–758, a plurality of digital to analog converters 760–768, a plurality of current sources 770–778, and a plurality of transistors 780–794. Controller 240 is connected to the registers 750–758 via a bus 796. Controller 240 is able to set the current level of each of the current sources via the register and the digital to analog converter. For example, controller 240 sends a digital signal representing the appropriate power level via bus 796 to register 750. Register 750 holds the digital data and provides it to the digital analog converter 760 which converts the digital signal to a corresponding analog signal which represents the appropriate current level. The read current source 770 then is adjusted to the appropriate power level.

The current sources are adjusted to achieve the desired laser power level at the media. The read current source 770 provides enough current such that the laser 150 does not heat the media 110 to above its Curie temperature. Current source A 772 is set such that the laser 150 will provide a beam of maximum power at the media 110. This maximum value is set at the time of manufacture or may be determined by a calibration process on start-up of the drive. In the preferred embodiment, with pulse duration of 15 nanoseconds, the power level A is approximately 20 miliwatts at the media. Once current source A 772 is set, the power levels of the remaining current sources may be determined. Current sources are set such that $A > B > D > C$. In the preferred embodiments, the current source B 774 is set such that the power of the beam at the media will be 95–99 percent (ideally 97 percent) of the beam power of level A. The current source D 778 is set such that the power of beam at the media less than 95 percent and greater or equal to 90 percent (ideally 92 percent) of power level A. The current source C 776 is set such that the power of the beam at the media will be less than 90 percent and greater or equal to 80 percent (ideally 85 percent) of the beam power of level A.

In operation, the read current source 770 is always provided to laser 150. Laser 150 is always on at this lower read power level, even during the writing process, in order to provide servo information. Alternatively, source 770 may be switched to an even lower power level during a write process in order to further reduce thermal build-up in the medium. Such a power level is less than that required to read the medium, but adequate to generate the servo signals. Lines 720–726 from modulator 252 are connected to transistors 780, 784, 788 and 792, respectively. These transistors allow additional current from the current sources 772–778 to flow to laser 150 when these lines are raised. Thus, laser 150 is normally on at the reduced read power level, but will be raised to the higher power levels A, B, C and D for 15 nanosecond durations as required to write the pattern of the present invention.

The operation of system 100 may now be understood. See FIG. 4. During the write operation, controller 240 sends the digital data signal to the encoder 250 which converts the digital signal to an encoded digital data signal. This data is sent to the modulator 252 which converts the data into instructions to the laser driver 254 for writing the desired pulsed pattern of the present invention. In the preferred embodiment, the pattern is the (2,7) RLL pattern shown in FIG. 1. The laser 150 is pulsed (from the lower read level to the higher write levels) responsive to this and provides a pulsed beam 152 at the desired power levels. Beam 152 is powerful enough to heat the medium 110 to above the Curie temperature. At this temperature, medium 110 may be magnetically aligned in either an up or down direction. Medium 110 is initially magnetically aligned in a first direction. Controller 240 causes magnet control 132 to energize magnet 130 in the opposite direction to that of the medium. The desired pattern is recorded on the medium as changes in magnetic domain orientations.

See FIG. 5. When beam 152 is exactly focussed on medium 110, beam 196 will have a circular cross section 500 on detector 222. The sum of the amount of light hitting area C and D will be approximately equal to the sum of the amount of light hitting areas A, B, E and F, and will cause circuit 224 to generate a zero focus error signal. If beam 152 is slightly out of focus one way or the other, beam 196 will have a circular cross section 502 or 504 on detector 222. This change in circular cross section causes circuit 224 to generate a positive or negative focus error signal. The focus error signal is used by the focus servo 228 to control motor 176 to move lens 172 until the focus is again achieved.

If beam 152 is focussed exactly on a track of medium 110, then beam 196 will fall as a circular cross section 500 equally between the sections A, C and E, and the sections B, D and F. If beam 152 is off track, beam 196 will fall more on sections A, C and E, and less on sections B, D and F, or visa versa. This will result in a positive or negative tracking error signal being produced by circuit 230. This tracking error signal is then used by the track and seek servo 232 to control motor 122 to move head 120 until the beam is once again on track.

During a read operation, controller 240 causes laser driver 254 to energize laser 150 to generate the low power read level beam 152. Beam 152 hits medium 110. The low power beam does not heat medium 110 to above its Curie temperature. The reflected light 180 has its plane of polarization rotated one way or the other depending upon the magnetic domain orientations of the spots on the medium 110. These differences in polarization are detected by detectors 208 and 214, and data circuit 216 outputs a pulse width modulation data signal and the PWM decoder 218 converts the signal back to a digital signal.

Figure 9:
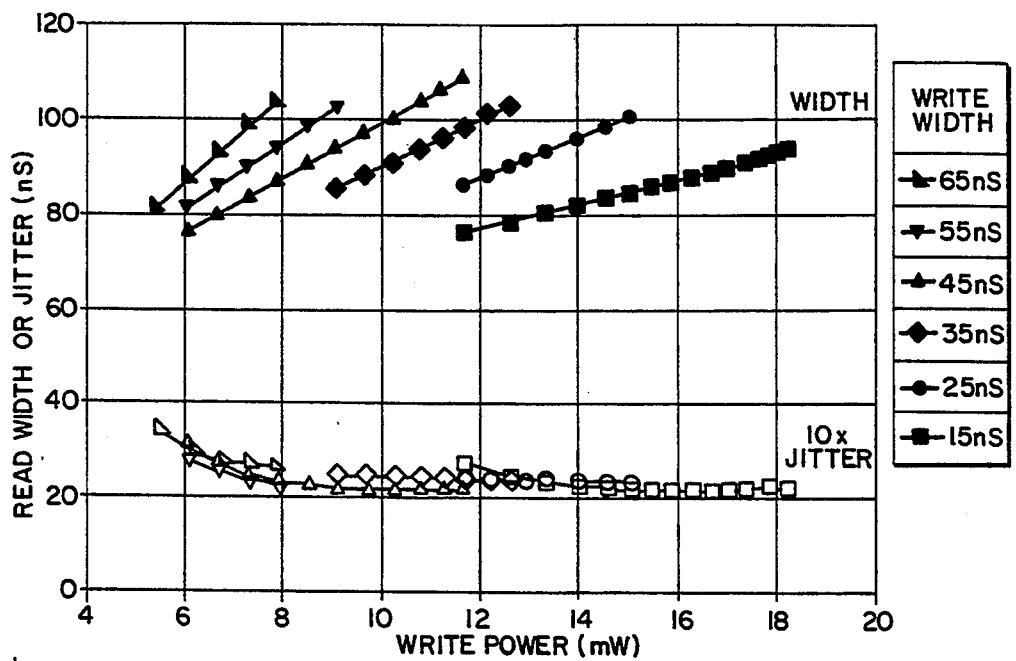
FIG. 9 is a graph of pulse width and jitter versus laser power level.

FIG. 9 shows a graph of pulse width and jitter versus write power of a laser beam for various pulse durations. The smaller the pulse duration the less dependent the mark width is on the laser power and the thermal interaction is reduced. In other words, by pulsing at very short time durations, as in the present invention, the diameter of the marks are approximately the same size even when they are recorded at slightly different power levels.

In the preferred embodiment, the power levels B, C and D all fall within the range of 80–100% of the maximum power level A. Also, since the lower power level marks B, C and D are used in multiple mark runs, their marks will experience some heat transfer from the surrounding marks. The result is that the B, C and D marks will have approximately the same diameter as the A marks.

In the present invention, the write pulse duration should be as short as possible and is substantially 15 nanoseconds or less in the preferred embodiment. This pulse duration t must be much less than the clock period T at the outer track of the disk. This clock period T will depend upon the disk size and rotational speed. The pulse duration t should be less than the clock period T for proper operation.

Another advantage of the short duration pulses is that there is a reduction in the jitter. Jitter is a measure of the deviation of the mark transitions from the ideal location. The graph shows that jitter is reduced for pulses of shorter duration.

Figure 10:
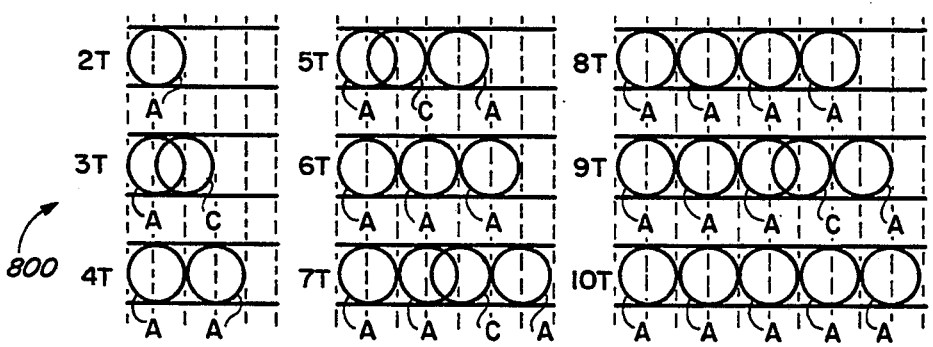
FIG. 10 is a schematic diagram of a recording pattern.

FIG. 10 is a schematic diagram of a recording pattern of the present invention which implements a (1,N) RLL code and is designated by the general reference number 800. The minimum run length of 2T is comprised of a single circular mark formed by a pulsed laser beam at power level A. The 3T run is formed by a first circular mark at power level A and a second circular mark at power level C which overlaps the first mark by one half of a diameter. The 4T run is comprised of two contiguous marks at power level A. The 5T run is comprised of a first mark at power level A, a second mark at power level C which overlaps the first mark by one half of a diameter, and a third mark formed at power level A which is contiguous with the second mark. The 6T run is comprised of three contiguous marks formed at power level A. The 7T run is comprised of a first mark formed at power level A, a second mark formed at power level A which is contiguous with the first mark, a third mark formed at power level C which overlaps the second mark by one half of a diameter, and a fourth mark formed at power level A which is contiguous with the third mark. The 8T run is comprised of four contiguous marks formed at power level A. The 9T run is comprised of a first mark formed at power level A, a second mark formed at power level A which is contiguous with the first mark, a third mark formed at power level A which is contiguous with the second mark, a fourth mark formed at power level C which overlaps the third mark by one half of a diameter, and a fifth mark formed at power level A which is contiguous with the fourth mark. The 10T run is comprised of five contiguous marks formed at power level A. It can be seen that the entire set of run lengths is based on combining the 2T and 3T run lengths. The 4T, 6T, 8T and 10T run lengths are made by combining contiguous 2T runs. The 3T, 5T, 7T and 9T runs are made by combining contiguous 2T and 3T runs.

In a preferred embodiment, a (1,7) RLL code is used. In this case, only the 2T-8T run lengths are needed. However, it can be seen that the present invention can be used with any number of (2,N) RLL codes.

Figure 11:
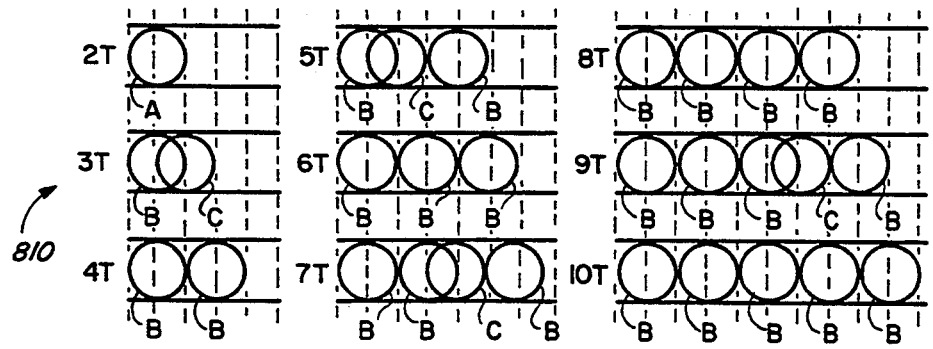
FIG. 11 is a schematic diagram of a recording pattern.

FIG. 11 is a schematic diagram of a recording pattern of the present invention which implements a (1,N) RLL code and is designated by the general reference number 810. Pattern 810 is similar to pattern 800 with the exception that there are now three power levels A, B and C, where A is greater than B which is greater than C. The highest power level A is only used with the isolated mark 2T.

Figure 12:
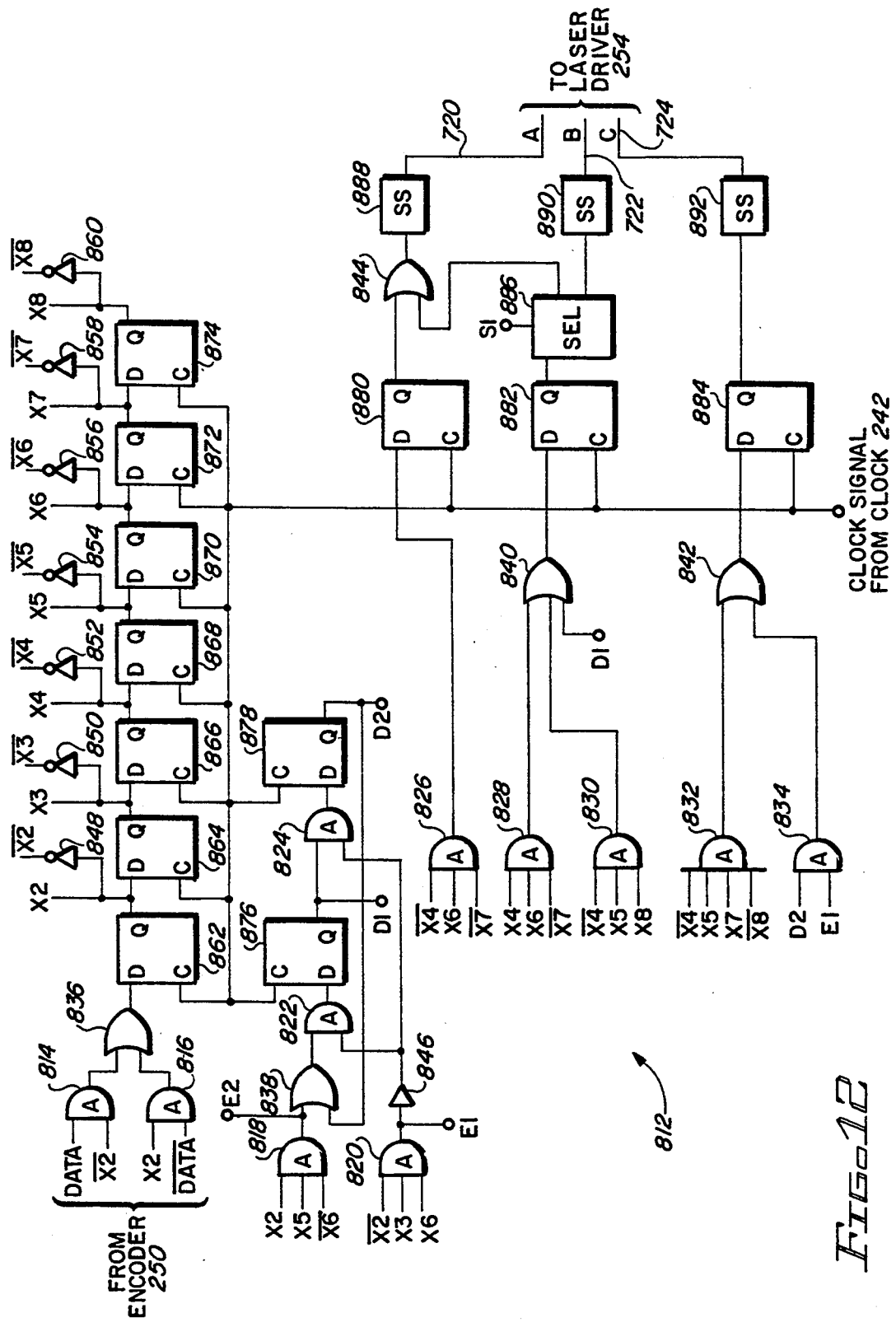
FIG. 12 is a circuit diagram of a modulator.

FIG. 12 is a circuit diagram of an alternative embodiment of the modulator and is designated by the general reference number 812. Modulator 812 implements patterns 800 and 810, and may be substituted for modulator 252 in system 100. Modulator 812 comprises a plurality of AND gates 814-834, a plurality of OR gates 836-844, a plurality of inverters 846-860, a plurality of flip-flops 862-884, a selector 886, and a plurality of single-shots 888-892. The input S1 to selector 886 determines which patterns 800 or 810 is written. If S1 is equal to zero, then pattern 800 is written, and if S1 equals one, then pattern 810 is written. The operation of modulator 812 is similar to that described above for modulator 252.

Figure 13:
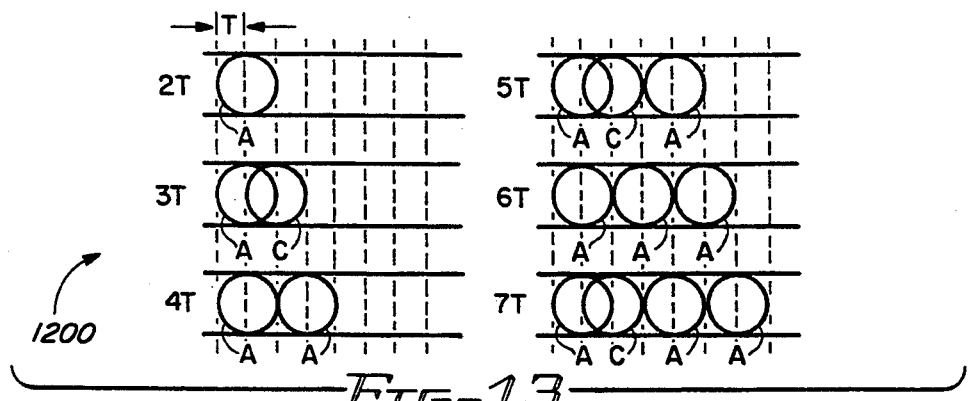
FIG. 13 is a schematic diagram of a recording pattern.

FIG. 13 is a schematic diagram of an alternative embodiment of the recording pattern of the present invention and is designated by the general reference number 1200. A (1,7) code is implemented using a pattern similar to that of pattern 800. The difference is that the 7T run has the overlap occurring on the leading edge mark rather than on a mark in the middle of the run.

Figure 14:
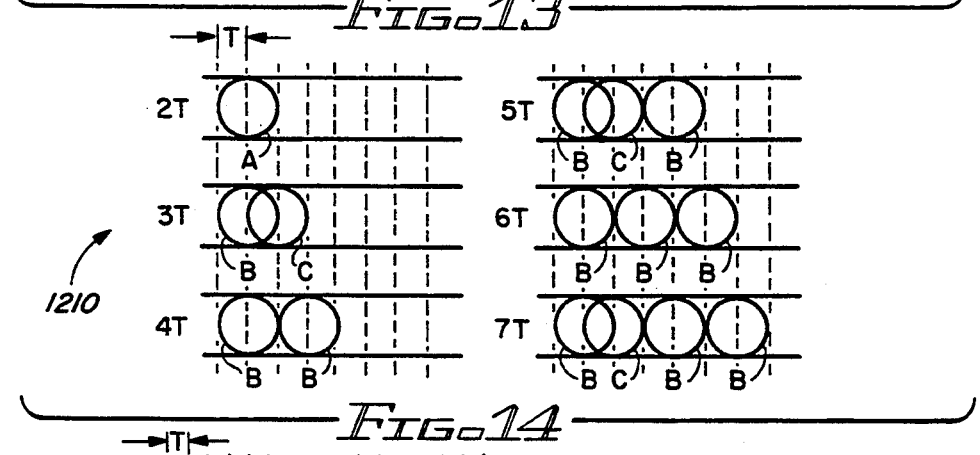
FIG. 14 is a schematic diagram of a recording pattern.

FIG. 14 is a schematic diagram of an alternative embodiment of a (1,7) code and is designated by the general reference number 1210. Pattern 1210 is similar to that of pattern 1200. The difference is that three power levels A, B and C, are now used, where $A > B > C$. The highest power level A is only used for the isolated 2T run.

Figure 15:
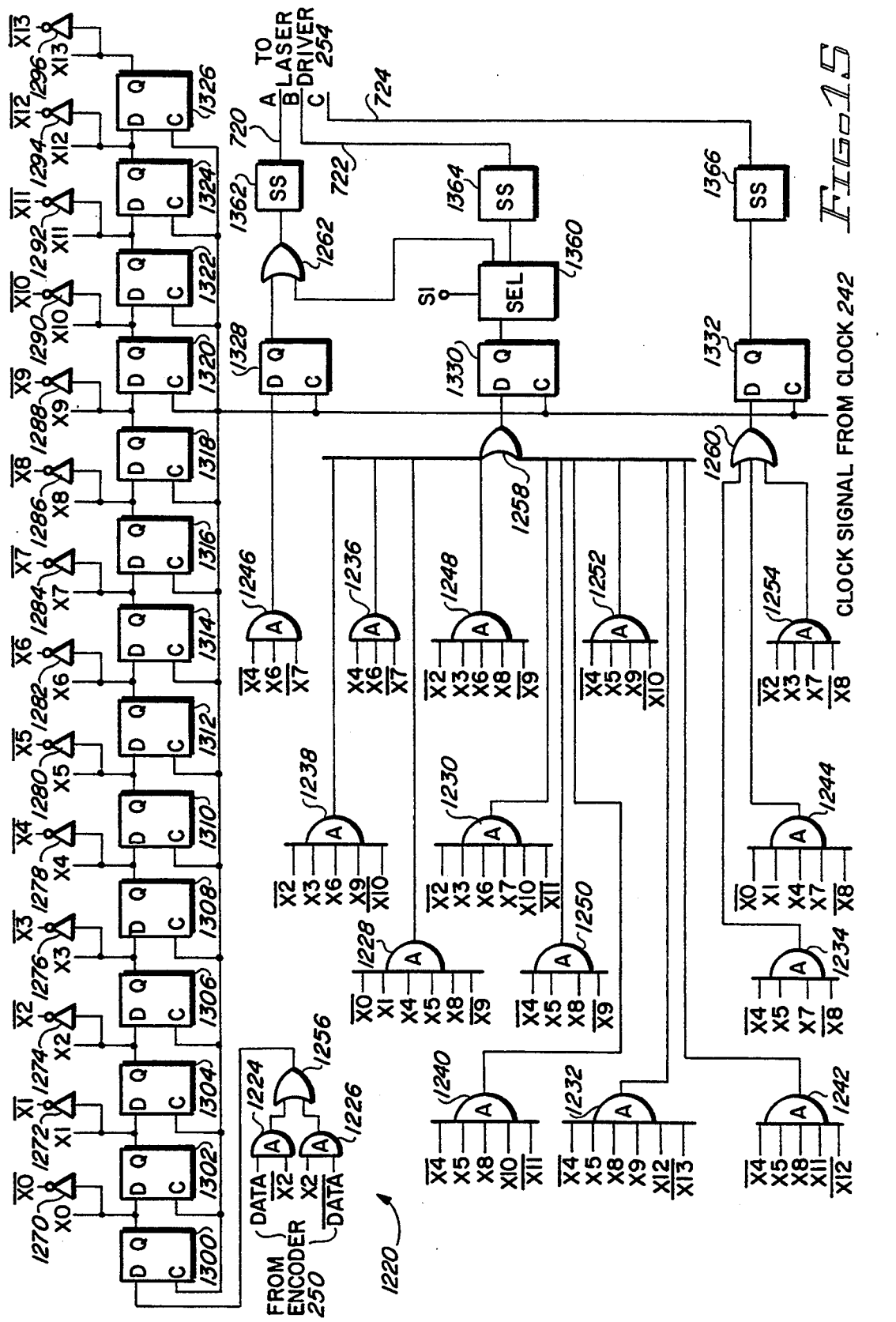
FIG. 15 is a circuit diagram of a modulator.

FIG. 15 is a circuit diagram of an alternative embodiment of the modulator and is designated by the general reference number 1220. Modulator 1220 implements patterns 1200 and 1210, and may be substituted for modulator 252 in system 100. Modulator 1220 comprises a plurality of AND gates 1224-1254, a plurality of OR gates 1256-1262, a plurality of inverters 1270-1296, a plurality of flip-flops 1300-1332, a selector 1360, and a plurality of single-shots 1362-1366.

Selector 1360 controls which of patterns 1200 and 1210 are recorded. If S1 equals zero, then pattern 1200 is recorded, and if S1 equals one, then pattern 1210 is recorded. The operation of modulator 1220 is similar to that described for modulator 252.

In the preceding patterns 10, 20, 30, 800, 810, 900 and 910 any necessary overlap between the marks occurs on a nontrailing edge mark. In other words, the last mark in the series or run is contiguous but does not overlap the preceding mark. The inventors have discovered that these types of patterns greatly reduce the thermal buildup in the medium and give good edge placement. Although optimally, these patterns should be written at the variable power levels shown, it is possible to obtain significant reduction in thermal buildup by the use of these patterns at one single power level. In such a case, current sources 772, 774, 776 and 778 are all set to a power level equivalent to the A power level. The patterns 10, 20, 30, 800, 810, 900 and 910 are then written with all of the circular marks at the A power level.

In the preceding embodiments, overlapping or contiguous marks have been used as filler marks in runs having three or more marks. All of these marks were of substantially the same diameter. For purposes of this discussion, these marks will be referred as standard marks. In the next two embodiments, the overlapping filler marks are replaced by a contiguous filler mark of smaller diameter which will be referred to as a non-standard mark.

Figure 16:
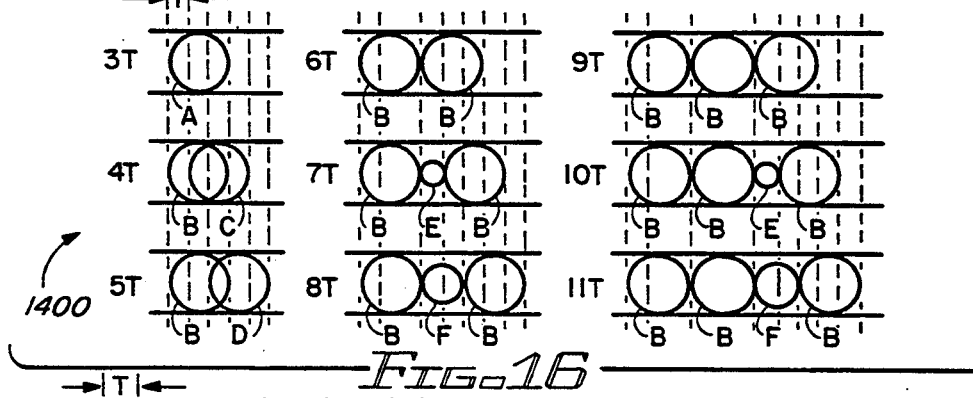
FIG. 16 is a schematic diagram of a recording pattern.

FIG. 16 is a schematic diagram of an alternative embodiment of the recording pattern of the present invention and is designated by the general reference number 1400. A (2,N) code is implemented which is similar to pattern 30, except that the overlapping filler marks in runs having three or more marks have been replaced with contiguous smaller diameter marks (non-standard marks) E and F. These changes occur in the 7T, 8T, 10T and 11T runs. The 7T and 10T runs (and every third run thereafter) previously had filler marks which overlap by two-thirds of a standard mark diameter. Now these runs have a single contiguous non-standard mark E having a diameter of one-third of a standard mark diameter. This non-standard mark is written with a laser beam of power E. The 8T and 11T runs (and every third run thereafter) which previously had filler marks which overlap by one-third of a standard mark diameter, now have a single contiguous non-standard mark F having a diameter of two-thirds of a standard mark diameter. This non-standard mark is written with a laser beam of power level F. These non-standard marks are written by greatly reducing the laser beam power level and slightly shifting the mark center position away from the preceding mark. The combination of the lower laser power level and the reduced thermal buildup from the preceding marks results in a smaller diameter mark. These non-standard marks are adequate as filler marks, but they are not distinct enough to use as the leading or trailing edge marks.

Figure 17:
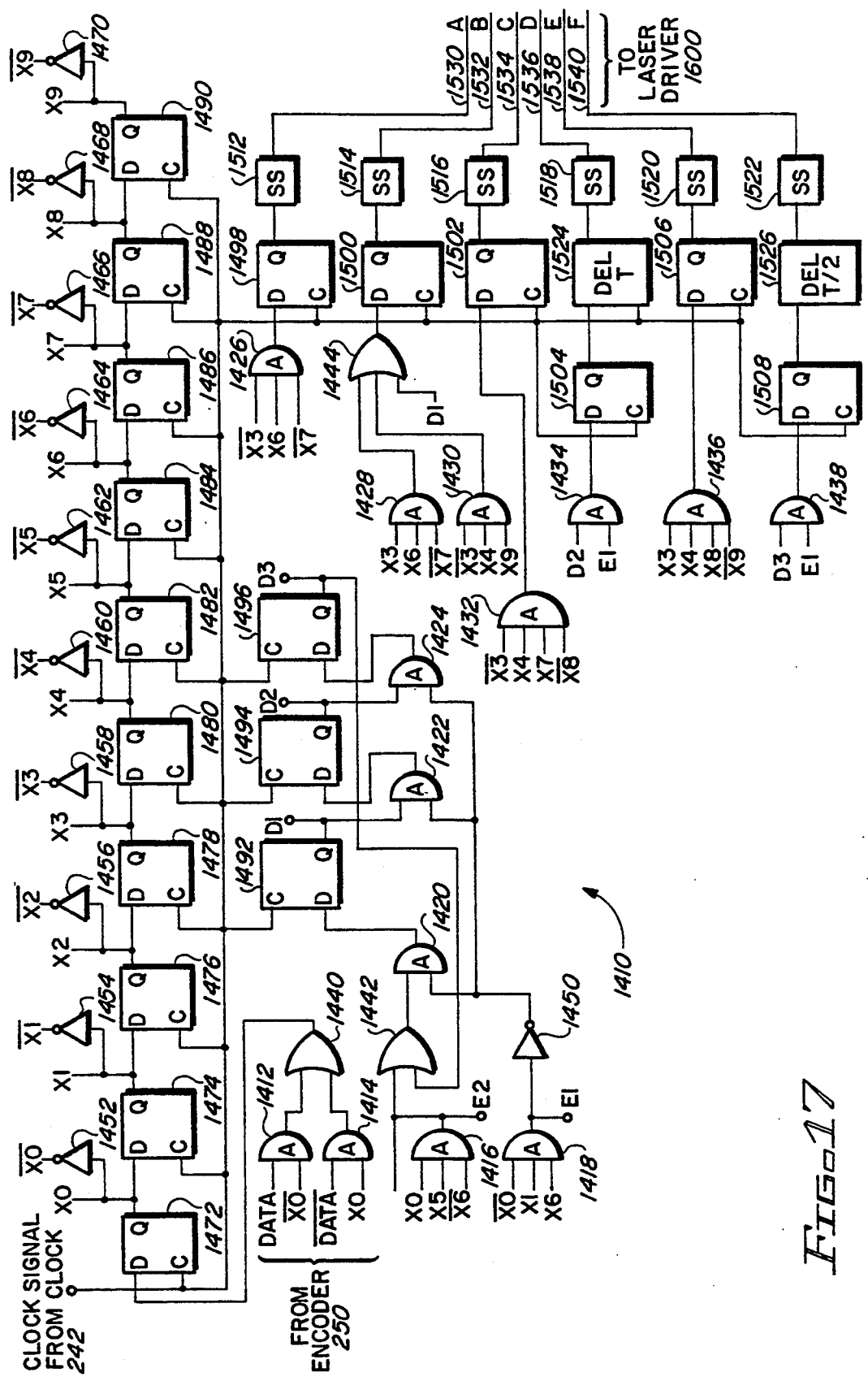
FIG. 17 is a circuit diagram of a modulator.

FIG. 17 is a circuit diagram of an alternative embodiment of the modulator and is designated by the general reference number 1410. Modulator 1410 implements pattern 1400 and may be substituted for modulator 252 in system 100. Modulator 1410 comprises a plurality of AND gates 1412–1438, a plurality of OR gates 1440–1444, a plurality of inverters 1450–1470, a plurality of flip-flops 1472–1510, a plurality of single-shots 1512–1522, and a plurality of one half clock delays 1524 and 1526. The modulator 1410 outputs power level signals A, B, C, D and F on lines 1530–1540, respectively. The operation of modulator 1410 is similar to that described for modulator 252.

FIG. 18 is a circuit diagram of a laser driver 1600. Elements of laser driver 1600 which are similar to laser driver 254 are designated by a prime number. The new elements are needed to implement the two new laser power levels E and F. These new elements include registers 1602, 1604, digital to analog converters (DAC) 1606 and 1608, current sources 1610 and 1612, and transistors 1614–1620. Current sources 770'–778' are set as previously described for laser driver 164. In a preferred embodiment, current source E 1610 is set such that the power of the beam at the media will be less than 60% and greater or equal to 50% (ideally 55%) of the beam power of level A. Current source F 1612 is set such that the power of the beam at the media will be less than 70% and greater or equal to 60% (ideally 65%) of the power of the beam at level A.

Figure 19:
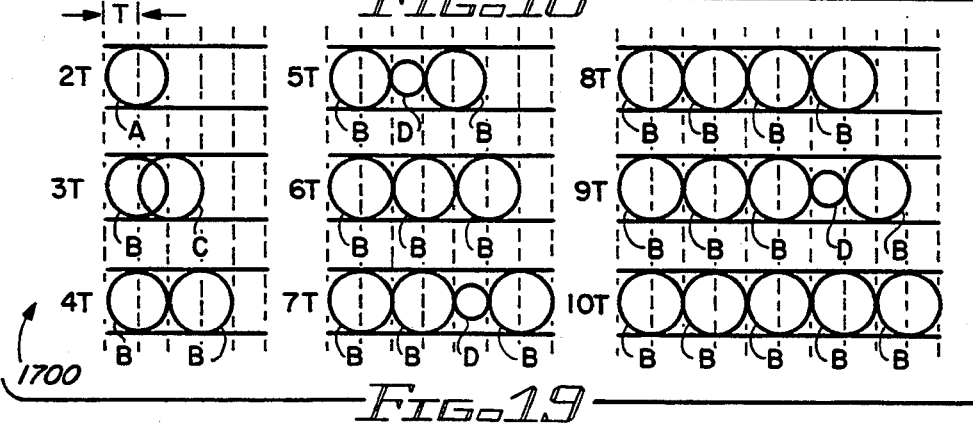
FIG. 19 is a schematic diagram of a recording pattern.

FIG. 19 is a schematic diagram of an alternative embodiment of the recording pattern of the present invention and is designated by the general reference number 1700. A (1,N) code is implemented which is similar to pattern 810 except that the overlapping filler marks in runs having three or more marks have been replaced with contiguous smaller diameter marks (non-standard marks). These changes occur in the 5T, 7T, 9T, and alternate runs thereafter. These runs previously had filler marks which overlap by one half of a standard marked diameter, and now have a single contiguous non-standard mark D having a diameter of one half of a standard mark. This mark is made with a laser beam at power level D.

Figure 20:
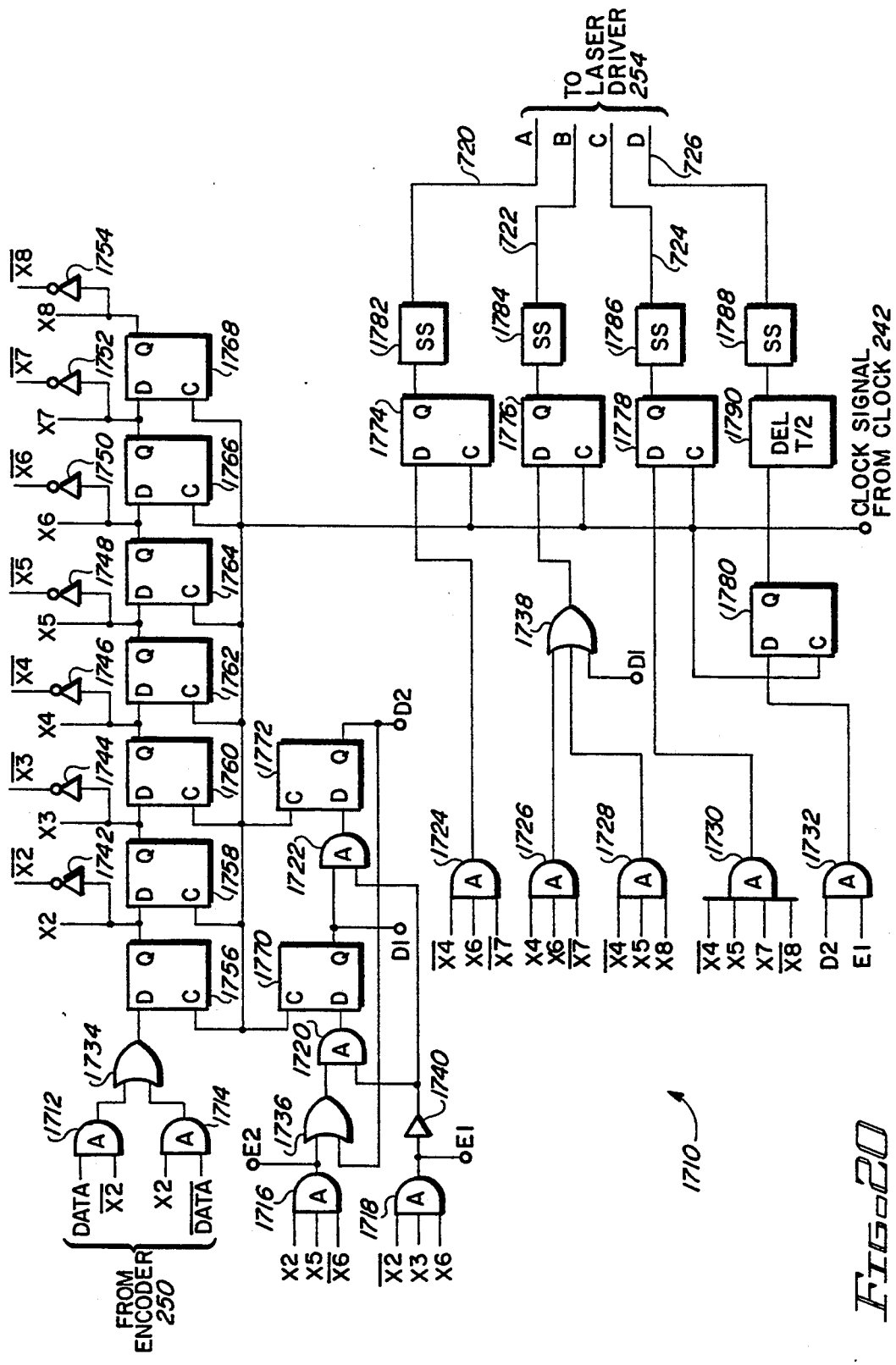
FIG. 20 is a circuit diagram of a modulator.

FIG. 20 is a circuit diagram of an alternative embodiment of a modulator and is designated by the general reference number 1710. Modulator 1710 implements pattern 1700 and may be substituted for modulator 252 in system 100. Modulator 1410 comprises a plurality of AND gates 1712–1732, a plurality of OR gates 1734–1738, a plurality of inverters 1740–1754, a plurality of flip-flops 1756–1780, a plurality of single-shots 1782–1788 and a one half clock delay 1790.

The modulator 1710 is connected to the laser driver 254 via lines 720–726. The laser driver 254 has power levels A, B and C set at the levels previously described. However, level D is now set so that the power of the beam at the media is less than 60% and greater or equal to 50% (ideally 55%) of the beam power at level A.

Figure 21:
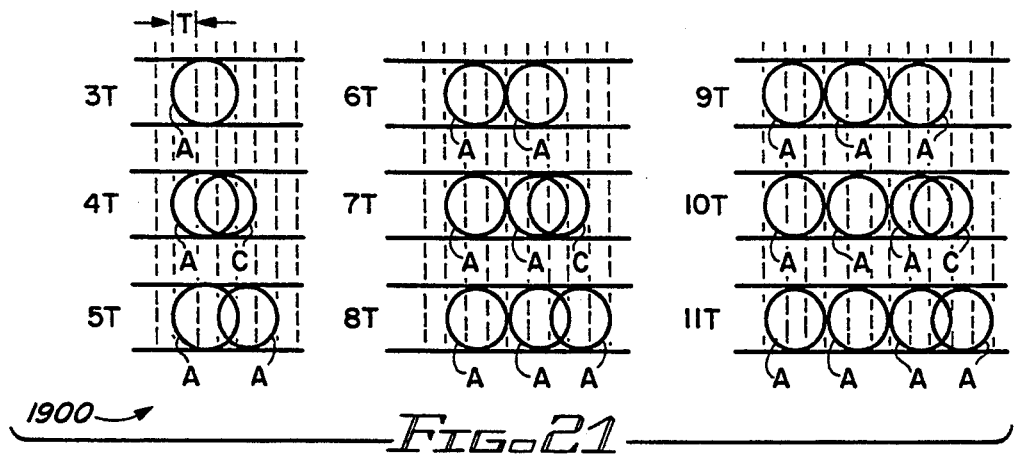
FIG. 21 is a schematic diagram of a recording pattern.

FIG. 21 is a schematic diagram of an alternative embodiment of the recording pattern of the present invention and is designated by the general reference number 1900. A (2,N) code is implemented using a pattern similar to that of pattern 10. The difference is that the 7T, 8T, 10T and 11T runs have overlaps on the last mark.

Figure 22:
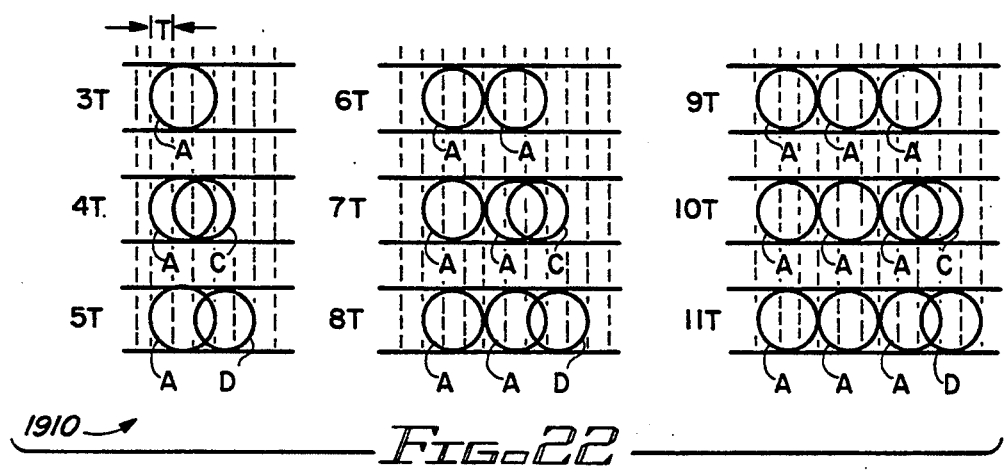
FIG. 22 is a schematic diagram of a recording pattern.

FIG. 22 is a schematic diagram of a (2,N) pattern which is designated by the general reference number 1910. Pattern 1910 which is similar to pattern 1900 with the exception that there are now three power levels A, C and D, where A is greater than D is greater C. The power level C is used to record the second mark when two marks overlap by more than one half of a diameter. The power level D is used to write the second mark when two marks overlap by less than one half of a diameter.

Figure 23:
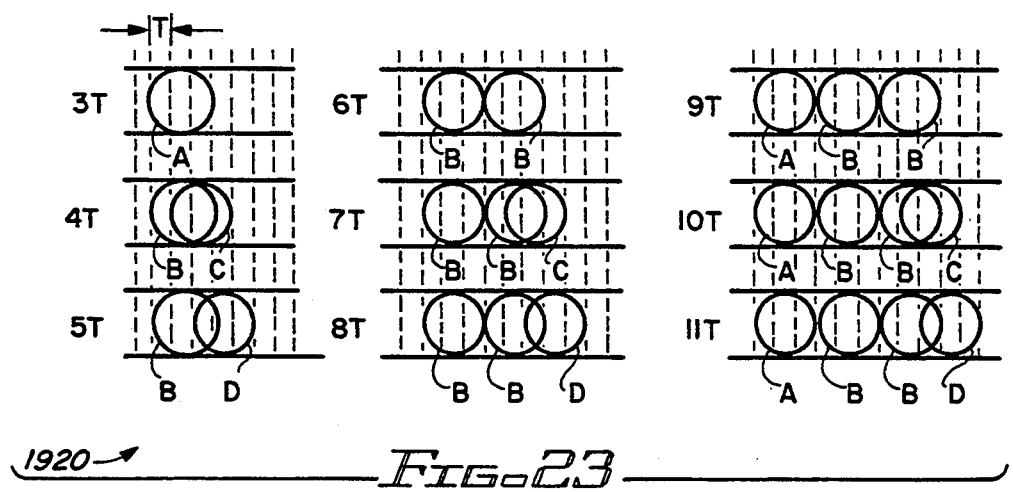
FIG. 23 is a schematic diagram of a recording pattern.

FIG. 23 is a schematic diagram of a (2,N) pattern which is designated by the general reference number 1920. Pattern 1920 is similar to pattern 1900 with the exception that there are now four power levels A, B, C and D, where A is greater than B is greater than D is greater than C. The highest power level A is only used to write the isolated mark 3T.

FIG. 24 is a circuit diagram of an alternative embodiment of the modulator and is designated by the general reference number 1922. Modulator 1922 implements patterns 1900, 1910 and 1920 and may be substituted for modulator 252 in system 100. Modulator 1922 comprises a plurality of AND gates 1924–1934, a plurality of OR gates 1936 and 1938, a plurality of flip-flops 1940–1960, a plurality of selectors 1962 and 1964, and a plurality of single-shots 1966–1972.

Selectors 1962 and 1964 control which of the patterns is recorded. If (S1,S2) is equal to (0,0) then the 1900 pattern is recorded, and if (0,1) then the 1910 pattern is recorded, if (1,0) then the 1920 pattern is implemented. The operation of modulator 1922 is similar that described for modulator 252, above.

FIG. 25 is a schematic diagram of an alternative embodiment of the recording pattern of the present invention and is designated by the general reference number 2000. A (1,N) code is implemented using a pattern similar to that of pattern 800. The difference is that the 5T and 9T runs have overlaps on the last mark.

FIG. 26 is a schematic diagram of an alternative embodiment of a (1,N) code and is designated by the general reference number 2010. Pattern 2010 is similar to that of pattern 2000. The difference is that three power levels A, B and C, are now used, where A is greater than B is greater than C. The highest power level A is only used for the isolated 2T mark.

FIG. 27 is a circuit diagram of an alternative embodiment of the modulator and is designated by the general reference number 2020. Modulator 2020 implements patterns 2000 and 2010, and may be substituted for modulator 252 in system 100. Modulator 2020 comprises a plurality of AND gates 2022–2030, a plurality of OR gates 2032–2034, a plurality of flip-flops 2036–2050, a selector 2052, and a plurality of single-shots 2054–2058.

Selector 2052 controls which of patterns 2000 and 2010 are recorded. If S1 equals zero, then pattern 2000 is recorded, and if S1 equals one, then pattern 2010 is recorded. The operation of modulator 2020 is similar to that described for modulator 252.

FIG. 28 is a schematic diagram of an alternative embodiment of the recording pattern of the present invention and is designated by the general reference number 2100. A (2,N) code is implemented using a pattern in which all marks overlap. The two power levels A and C are used to write the marks. The lower power level C is used when two marks overlap by more than one half of a mark diameter.

Figure 29:
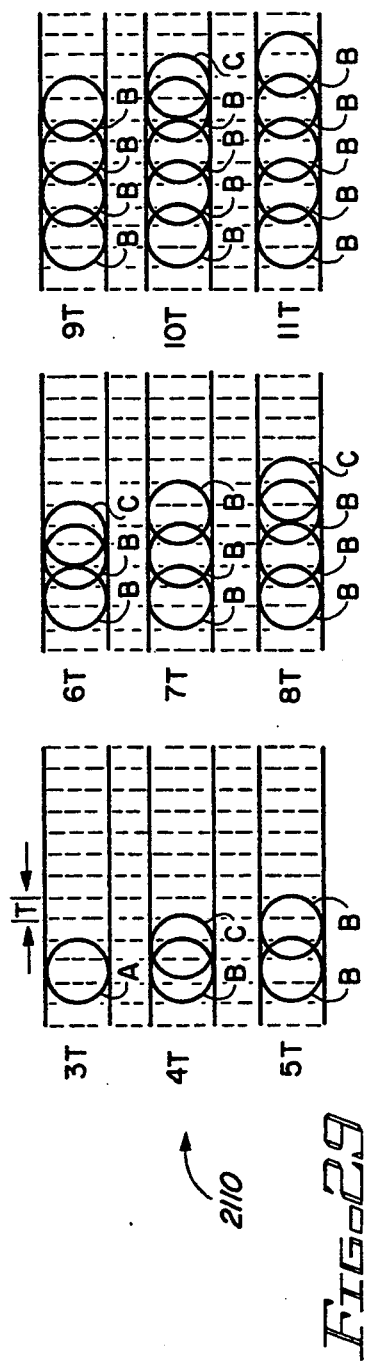
FIG. 29 is a schematic diagram of a recording pattern.

FIG. 29 is a schematic diagram of an alternative embodiment of (2,N) code and is designated by the general reference number 2110. Pattern 2110 is similar to that of pattern 2100. The difference is that three power levels A, B and C are now used, where A>B>C. The highest power level A is only used for the isolated 3T mark.

Figure 30:
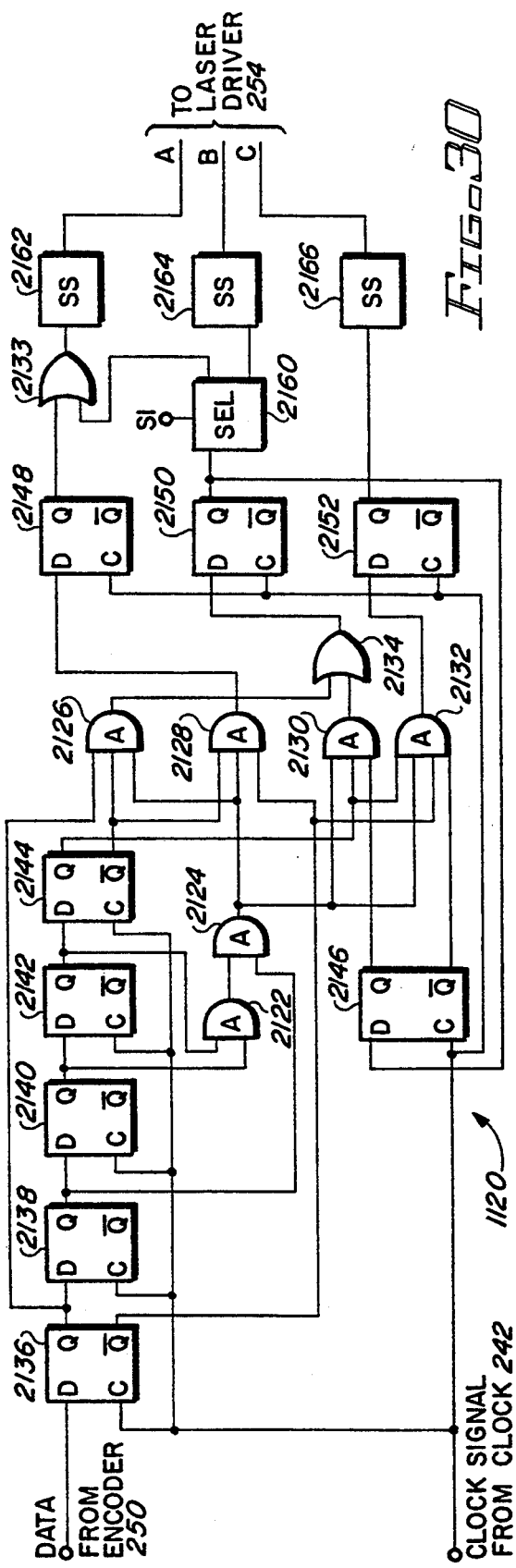
FIG. 30 is a circuit diagram of a modulator.

FIG. 30 is a circuit diagram of an alternative embodiment of the modulator and is designated by the general reference number 2120. Modulator 2120 implements patterns 2100 and 2110, and may be substituted for modulator 252 in system 100. Modulator 2120 comprises a plurality of AND gates 2122–2132, a plurality of OR gates 2133–2134, a plurality of flip-flops 2136–2152, a selector 2160, and a plurality of single-shots 2162–2166.

Selector 2160 controls which of patterns 2100 and 2110 are recorded. If S1 equals zero, then pattern 2100 is recorded, and if S1 equals one, then pattern 2110 is recorded. The operation of modulator 2120 is similar to that described for modulator 252.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An optical data storage system comprising:
   an optical data storage medium;
   a radiation source for directing a radiation beam to the medium;
   a movement device for moving the medium relative to the radiation beam; and
   a controller connected to the radiation source for pulsing the radiation beam to form substantially circular marks on the medium, the marks forming runs of variable length wherein the length of the runs corresponds to digital data, a run of three or more connecting marks having an overlap occurring on two of the marks in the run and not overlapping the remaining marks in the run.

2. The system of claim 1, wherein the duration of the pulse is 15 nanoseconds or less.

3. The system of claim 1, wherein four or more marks are formed in a connecting manner, and the overlap occurs on a nonleading edge mark.

4. The system of claim 1, wherein four or more marks are formed in a connecting manner and the overlap occurs on a leading edge mark.

5. The system of claim 1, wherein the width of the overlap is equal to one-half of the diameter of the circular marks.

6. The system of claim 1, wherein the width of the overlap is equal to two-thirds of the diameter of the circular marks.

7. The system of claim 1, wherein the width of the overlap is equal to one-third of the diameter of the circular marks.

8. The system of claim 1, wherein one of the two marks which overlap is formed by a pulsed radiation beam at a reduced power level compared to the power level used to form the other marks in the run.

9. A method for optical data storage comprising the steps of:
   moving an optical data storage medium relative to a radiation source;
   directing a radiation beam from the radiation source to the medium; and
   pulsing the radiation beam to form substantially circular marks on the medium, the marks forming runs of variable length wherein the length of the runs correspond to digital data, forming a run of three or more connecting marks, overlapping two of the marks in the run and not overlapping the remaining marks in the run.

10. The method of claim 9, wherein the duration of the pulse is 15 nanoseconds or less.

11. The method of claim 9, wherein four or more marks are formed in a connecting manner and the overlap occurs on a nonleading edge mark.

12. The method of claim 9, wherein four or more marks are formed in a connecting manner and the overlap occurs on a leading edge mark.

13. The method of claim 9, wherein the width of the overlap is equal to one-half of the diameter of the circular marks.

14. The method of claim 9, wherein the width of the overlap is equal to two-thirds of the diameter of the circular marks.

15. The method of claim 9, wherein the width of the overlap is equal to one-third of the diameter of the circular marks.

16. The method of claim 9, wherein one of the two marks which overlap is formed by a pulsed radiation beam at a reduced power level compared to the power level used to form the other marks in the run.

17. An optical data storage system comprising:
   an optical data storage medium;
   a radiation source for directing a radiation beam to the medium;
   a movement device for moving the medium relative to the radiation beam; and
   a controller connected to the radiation source for pulsing the radiation beam to write substantially circular marks on the medium, the marks forming runs of variable length wherein the length of the runs correspond to digital data, three or more circular marks comprising a run having a leading edge mark, a trailing edge mark, and at least one intermediate filler mark, wherein one of the filler marks is comprised of a circular mark having a diameter less than the diameter of the leading and trailing edge marks and which is contiguous with the surrounding marks, the controller including a filler mark device for producing the filler mark of a reduced diameter.

18. The system of claim 17, wherein at least one of the filler marks is formed by a pulsed radiation beam at a reduced power level compared to the power level used to form the leading and trailing edge marks.

19. The system of claim 17, wherein a radiation beam of a first power level is used to form a single unconnected circular mark, a radiation beam of a second power level is used to form the leading and trailing edge marks, and a radiation beam of a third power level is used to form the filler marks, the second power level being 95–99% of the first power level, the third power level being greater or equal to 50% and less than 70% of the first power level.

20. The system of claim 17, wherein the diameter of the filler mark is substantially one-third of the diameter of the leading and trailing edge marks.

21. The system of claim 17, wherein the diameter of the filler mark is substantially two-thirds of the diameter of the leading and trailing edge marks.

22. The system of claim 17, wherein the diameter of the filler mark is substantially one-half of the diameter of the leading and trailing edge marks.

23. The system of claim 17, wherein the duration of the pulse is 15 nanoseconds or less.

24. A method for optical data storage comprising the steps of:
moving an optical data storage medium relative to a radiation source;
directing a radiation beam from the radiation source to the medium; and
using a controller to pulse the radiation beam to form substantially circular marks on the medium, the marks forming runs of variable length wherein the length of the runs correspond to digital data, three or more circular marks comprising a run having a leading edge mark, a trailing edge mark, and at least one intermediate filler mark, wherein one of the filler marks is comprised of a circular mark having a diameter less than the diameter of the leading and trailing edge marks and which is contiguous with the surrounding marks, the controller including a filler mark device for producing the filler mark of a reduced diameter.

25. The method of claim 24, wherein at least one of the filler marks is formed by a pulsed radiation beam at a reduced power level compared to the power level used to form the leading and trailing edge marks.

26. The method of claim 24, wherein a radiation beam of a first power level is used to form a single unconnected circular mark, a radiation beam of a second power level is used to form the leading and trailing edge marks, and a radiation beam of a third power level is used to form the filler marks, the second power level being 95–99% of the first power level, the third power level being greater or equal to 50% and less than 70% of the first power level.

27. The method of claim 24, wherein the diameter of the filler mark is substantially one-third of the diameter of the leading and trailing edge marks.

28. The method of claim 24, wherein the diameter of the filler mark is substantially two-thirds of the diameter of the leading and trailing edge marks.

29. The method of claims 24, wherein the diameter of the filler mark is substantially one-half of the diameter of the leading and trailing edge marks.

30. The method of claim 24, wherein the duration of the pulse is 15 nanoseconds or less.

31. A method for optical data storage comprising the steps of:
moving an optical data storage medium relative to a radiation source;
directing a radiation beam from the radiation source to the medium; and
pulsing the radiation beam to form substantially circular marks on the medium, the marks forming runs of variable length wherein the length of the runs correspond to digital data, the pulsed radiation beam having a first power level and a second power level less than the first power level, a run having two or more circular marks, wherein two of the marks overlap each other by greater than or equal to one-half the diameter of the circular mark, is formed with one of the two overlapping marks formed by a pulsed radiation beam of a first power level and the remaining one of the two overlapping marks formed by a pulsed radiation beam of the second power level, the overlap containing at most two marks.

32. The method of claim 31, wherein circular marks which overlap by less than half the diameter of the circular mark are formed with one of the marks formed by a pulsed radiation beam of the first power level and the remaining mark formed by a pulsed radiation beam of a third power level, the third power level less than the first power level but greater than the second power level.

33. The method of claim 32, wherein circular marks which overlap by less than half the diameter of the circular marks have an overlap width equal to one-third the diameter of the circular marks.

34. The method of claim 31, wherein the second power level is greater or equal to 80% and less than 90% of the first power level.

35. The method of claim 31, wherein three or more marks are formed in a connecting manner and an overlap occurs only on a nontrailing edge mark.

36. The method of claim 31, wherein three or more marks are formed in a connecting manner and an overlap occurs only on a nonleading edge mark.

37. The method of claim 31, wherein a single nonconnecting circular mark is formed by a pulsed radiation beam of a third power level, the third power level greater than the first and second power levels.

38. The method of claim 31, wherein the width of the overlap is equal to one-half of the diameter of the circular marks.

39. The method of claim 31, wherein the width of the overlap is equal to two-thirds of the diameter of the circular marks.

40. The method of claim 31, wherein the duration of the pulse is 15 nanoseconds or less.

41. An optical data storage system comprising:
an optical data storage medium;
a radiation source having a plurality of power levels, for directing a radiation beam to the medium;
a movement device for moving the medium relative to the radiation beam; and
a controller connected to the radiation source for pulsing the radiation beam to form substantially circular marks on the medium, the marks forming runs of variable length wherein the length of the runs correspond to digital data, the pulsed radiation beam having a first power level and a second power level less than the first power level, a run having two or more circular marks, wherein two of the marks overlap each other by greater than or equal to one-half the diameter of the circular mark, is formed with one of the two overlapping marks formed by a pulsed radiation beam of a first power level and the remaining one of the two overlapping marks formed by a pulsed radiation beam of the second power level, the overlap containing at most two marks.

42. The system of claim 41, wherein circular marks which overlap by less than half the diameter of the circular mark are formed with one of the marks formed by a pulsed radiation beam of the first power level and the remaining mark formed by a pulsed radiation beam of a third power level, the third power level less than the first power level but greater than the second power level.

43. The system of claim 42, wherein circular marks which overlap by less than half the diameter of the circular mark have an overlap width equal to one-third the diameter of the circular marks.

44. The system of claim 41, wherein the duration the pulse is 15 nanoseconds or less.

45. The system of claim 41, wherein the second power level is greater or equal to 80% and less than 90% of the first power level.

46. The system of claim 41, wherein three or more marks are formed in a connecting manner and an overlap occurs only on a nontrailing edge mark.

47. The system of claim 41, wherein three or more marks are formed in a connecting manner and an overlap occurs only on a nonleading edge mark.

48. The system of claim 41, wherein a single nonconnecting circular mark is formed by a pulsed radiation beam of a third power level, the third power level greater than the first and second power levels.

49. The system of claim 41, wherein the width of the overlap is equal to one-half of the diameter of the circular marks.

50. The system of claim 41, wherein the width of the overlap is equal to two-thirds of the diameter of the circular marks.

51. A method for optical data storage comprising the steps of:
moving an optical data storage medium relative to a radiation source;
directing a radiation beam from the radiation source to the medium; and
pulsing the radiation beam to form substantially circular marks on the medium, the marks forming runs of variable length wherein the length of the runs correspond to digital data, three or more marks written in a connecting manner having an overlap occurring on a nontrailing edge mark and having no overlap occurring on a trailing edge mark.

52. The method of claim 51, wherein the width of the overlap is equal to two-thirds of the diameter of the circular marks.

53. The method of claim 51, wherein the width of the overlap is equal to one-third of the diameter of the circular marks.

54. The method of claim 53, wherein the duration of the pulse is 15 nanoseconds or less.

55. The method of claim 53, wherein four or more marks are formed in a connecting manner and the overlap occurs on a nonleading edge mark.

56. The method of claim 51, wherein four or more marks are formed in a connecting manner and the overlap occurs on a leading edge mark.

57. The method of claim 51, wherein the width of the overlap is equal to one-half of the diameter of the circular marks.

58. An optical data storage system comprising:
an optical data storage medium;
a radiation source for directing a radiation beam to the medium;
a movement device for moving the medium relative to the radiation beam; and
a controller connected to the radiation source for pulsing the radiation beam to form substantially circular marks on the medium, the marks forming runs of variable length wherein the length of the runs correspond to digital data, three or more marks written in a connecting manner are written with an overlap occurring on a nontrailing edge mark and having no overlap occurring on a trailing edge mark.

59. The system of claim 58, wherein the width of the overlap is equal to one-half of the diameter of the circular marks.

60. The system of claim 58, wherein the width of the overlap is equal to two-thirds of the diameter of the circular marks.

61. The system of claim 58, wherein the width of the overlap is equal to one-third of the diameter of the circular marks.

62. The system of claim 58, wherein the duration of the pulse is 15 nanoseconds or less.

63. The system of claim 58, wherein four or more marks are formed in a connecting manner and the overlap occurs on a nonleading edge mark.

64. The system of claim 58, wherein four or more marks are formed in a connecting manner and the overlap occurs on a leading edge mark.

* * * * *

UNITED STATES PATENT AND TRADEMARK OFFICE
CERTIFICATE OF CORRECTION

PATENT NO. : 5,400,313
DATED : March 21, 1995
INVENTOR(S) : K. Belser et al

It is certified that error appears in the above-indentified patent and that said Letters Patent is hereby corrected as shown below:

Column 2, line 26, delete "prior an" and add --prior art--

Signed and Sealed this

Twenty-fourth Day of October, 1995

Attest:

BRUCE LEHMAN

Attesting Officer         Commissioner of Patents and Trademarks